*(12)* United States Patent
Park et al.

(10) Patent No.: US 11,031,788 B2
(45) Date of Patent: Jun. 8, 2021

(54) CHARGING CONTROL METHOD FOR BATTERY BASED ON TIME AND ELECTRONIC DEVICE SUPPORTING THE SAME

(71) Applicant: Samsung Electronics Co., Ltd., Gyeonggi-do (KR)

(72) Inventors: Chul Woo Park, Gyeonggi-do (KR); Sang Hyun Ryu, Gyeonggi-do (KR); Ku Chul Jung, Gyeonggi-do (KR); Se Young Jang, Gyeonggi-do (KR); Chi Hyun Cho, Gyeonggi-do (KR)

(73) Assignee: Samsung Electronics Co., Ltd

( * ) Notice: Subject to any disclaimer, the term of this patent is extended or adjusted under 35 U.S.C. 154(b) by 406 days.

(21) Appl. No.: 15/849,031

(22) Filed: Dec. 20, 2017

(65) Prior Publication Data
US 2018/0183254 A1     Jun. 28, 2018

(30) Foreign Application Priority Data

Dec. 26, 2016     (KR) .................. 10-2016-0178792

(51) Int. Cl.
*H02J 7/00*     (2006.01)
*G06F 3/01*     (2006.01)
(Continued)

(52) U.S. Cl.
CPC ............ *H02J 7/00* (2013.01); *G06F 3/01* (2013.01); *H01M 10/425* (2013.01);
(Continued)

(58) Field of Classification Search
CPC .......... H02J 7/00; H02J 7/0071; H02J 7/0047; H02J 7/00045; H02J 7/0048;
(Continued)

(56) References Cited

U.S. PATENT DOCUMENTS 5,493,198 A * 2/1996 Kamke ............... H01M 10/443
                                                          320/150
5,617,009 A * 4/1997 Takao ..................... H02J 7/022
                                                          320/138

(Continued)

FOREIGN PATENT DOCUMENTS

CN     104539005     4/2015
EP     2 490 293     8/2012

(Continued)

OTHER PUBLICATIONS

European Search Report dated May 23, 2018 issued in counterpart application No. 17208611.8-1202, 11 pages.

(Continued)

*Primary Examiner* — Drew A Dunn
*Assistant Examiner* — Sailesh Thapa
(74) *Attorney, Agent, or Firm* — The Farrell Law Firm, P.C.

(57) ABSTRACT

An electronic device is disclosed, and includes a battery supplying power to the electronic device, a charging circuit charging the battery, and a processor. The processor is configured to obtain context information associated with charging of the battery, if the context information satisfies a first specified condition, to set a timer associated with a charging time of the charging circuit to a first time, if the context information satisfies a second specified condition, to set the timer to a second time different from the first time, and to charge the battery by using the charging circuit during the first time corresponding to the first specified condition or the second time corresponding to the second specified condition.

19 Claims, 17 Drawing Sheets

(51) Int. Cl.
    *H01M 10/44*     (2006.01)
    *H01M 10/48*     (2006.01)
    *H01M 10/42*     (2006.01)
    *H02J 7/04*     (2006.01)

(52) U.S. Cl.
    CPC ........... *H01M 10/44* (2013.01); *H01M 10/48* (2013.01); *H02J 7/0047* (2013.01); *H02J 7/0071* (2020.01); *H02J 7/00045* (2020.01); *H02J 7/0048* (2020.01); *H02J 7/0077* (2013.01); *H02J 7/007192* (2020.01); *H02J 7/045* (2013.01)

(58) Field of Classification Search
    CPC .... H02J 7/007192; H02J 7/045; H02J 7/0077; H02J 50/80; H02J 50/10; H02J 7/0088; H02J 2207/40; H02J 7/00036; H01M 10/44; H01M 10/48; H01M 10/425; H01M 10/4221; H01M 10/4257; H01M 2010/4278; H01M 2010/4271; G06F 3/01
    See application file for complete search history.

(56) References Cited

U.S. PATENT DOCUMENTS

| | | |
|---|---|---|
| 8,847,543 B2 | 9/2014 | Yagi et al. |
| 8,854,012 B2 | 10/2014 | Dai et al. |
| 8,970,165 B2 | 3/2015 | Wada et al. |
| 9,166,432 B2 | 10/2015 | Kurokawa et al. |
| 9,450,443 B2 | 9/2016 | Dai et al. |
| 9,853,476 B2 | 12/2017 | Lee et al. |
| 10,135,263 B2 | 11/2018 | Jung et al. |
| 10,186,887 B2* | 1/2019 | Wang .................. H01M 10/443 |
| 2012/0206086 A1 | 8/2012 | Yagi et al. |
| 2013/0049702 A1 | 2/2013 | Dai et al. |
| 2013/0154547 A1* | 6/2013 | Wada .................... H02J 7/0045 320/107 |
| 2013/0207597 A1 | 8/2013 | Kurokawa et al. |
| 2015/0102767 A1 | 4/2015 | Dai et al. |
| 2015/0180244 A1* | 6/2015 | Jung .................. H02J 7/00036 320/107 |
| 2016/0011238 A1 | 1/2016 | Kulkarni et al. |
| 2016/0023563 A1 | 1/2016 | Wang et al. |
| 2016/0141893 A1* | 5/2016 | Lee ....................... H02J 7/0071 320/107 |
| 2016/0372943 A1 | 12/2016 | Dai et al. |
| 2019/0097431 A1 | 3/2019 | Jung et al. |

FOREIGN PATENT DOCUMENTS

| | | |
|---|---|---|
| EP | 3 021 452 | 5/2016 |
| JP | 2014057471 | 3/2014 |
| KR | 1020040076430 | 9/2004 |

OTHER PUBLICATIONS

European Search Report dated Mar. 11, 2019 issued in counterpart application No. 17208611.8-1202, 6 pages.
European Search Report dated Jul. 27, 2020 issued in counterpart application No. 17208611.8-1202, 7 pages.

* cited by examiner

CHARGING CONTROL METHOD FOR BATTERY BASED ON TIME AND ELECTRONIC DEVICE SUPPORTING THE SAME

PRIORITY

This application claims priority under 35 U.S.C. § 119(a) to Korean Patent Application Serial No. 10-2016-0178792, which was filed in the Korean Intellectual Property Office on Dec. 26, 2016, the entire content of which is incorporated herein by reference.

BACKGROUND

1. Field of Disclosure

The present disclosure relates generally to battery charging, and more particularly, to an electronic device and method that charges a battery depending on a battery charging environment, a battery characteristic, and the like.

2. Description of Related Art

Portable electronic device such as a smartphone or a tablet personal computer (PC) are widely used. The portable electronic device may employ a battery and may operate by using power supplied by the battery. The portable electronic device may employ a Lithium-ion battery or the like that is rechargeable.

The charging performance of a battery mounted in a conventional portable electronic device may be degraded due to various reasons. In the case where the battery is charged in the normal manner but the charging performance is degraded, the battery may not be fully charged, or an excessive charging may cause the battery to ignite or explode.

SUMMARY

Various aspects of the present disclosure provide a time-based adaptive battery charging control method that charges a battery depending on a battery charging environment, a battery characteristic, or the like, and an electronic device supporting the same.

In accordance with an aspect of the present disclosure, the present disclosure provides an electronic device which includes a battery; a charging circuit; and a processor electrically connected to the battery and the charging circuit. The processor is configured to obtain context information associated with charging of the battery; if the context information satisfies a first specified condition, set a timer associated with a charging time of the charging circuit to a first time; if the context information satisfies a second specified condition, set the timer to a second time which is different from the first time; and charge the battery by using the charging circuit during the first time corresponding to the first specified condition or the second time corresponding to the second specified condition.

In accordance with an aspect of the present disclosure, a battery charging control method of an electronic device is provided which includes obtaining context information associated with charging of the battery by using the processor, if the context information satisfies a first specified condition, setting a timer associated with a charging time of the charging circuit to a first time, if the context information satisfies a second specified condition, setting the timer to a second time which is different from the first time; and charging the battery by using the charging circuit during the first time corresponding to the first specified condition or the second time corresponding to the second specified condition.

In accordance with an aspect of the present disclosure, an electronic device is provided and includes a housing; a battery disposed inside the housing; a charging interface disposed in one side of the housing; and a charging circuit electrically connected to the battery and the charging interface, and configured to control charging of the battery through the charging interface. The charging circuit is configured to if a charging device is connected to the charging interface, collect at least one factor associated with a charging environment of the battery and determine a change of a setting time of a charging limit timer limiting the charging of the battery, depending on the at least one factor.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers may be used to depict the same or similar elements, features, and structures.

DETAILED DESCRIPTION

Figure 1:
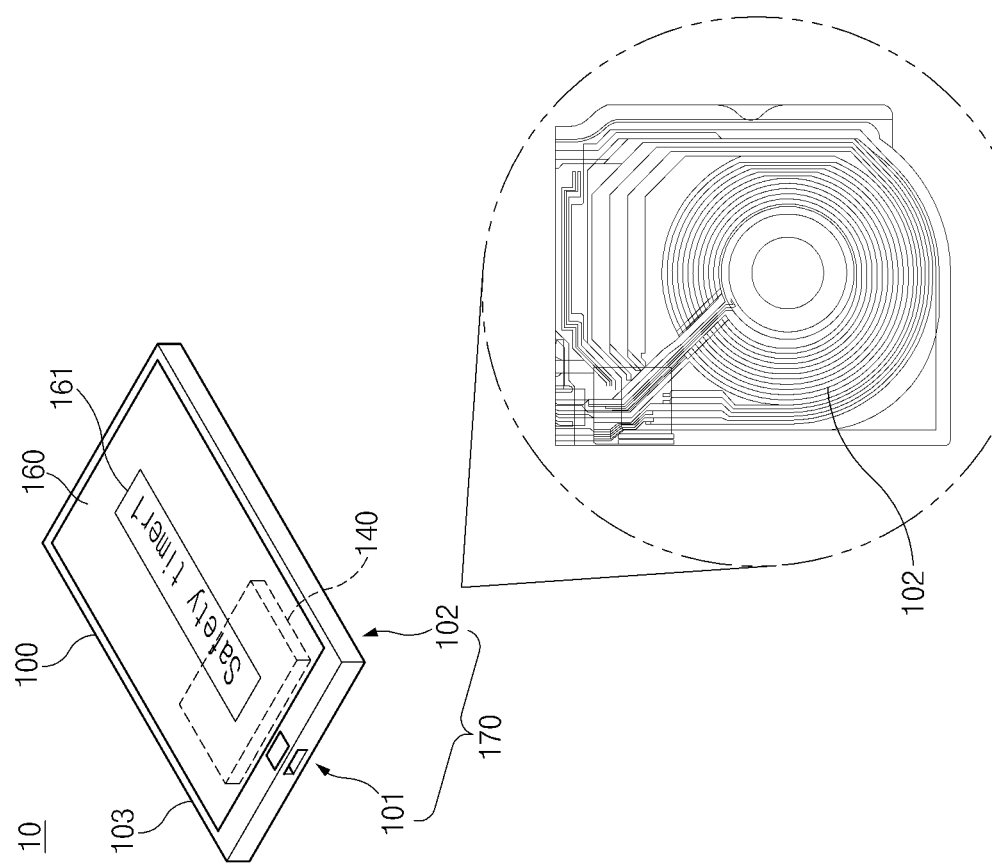
FIG. 1 illustrates a battery charging station according to an embodiment of the present disclosure.
Figure 1:
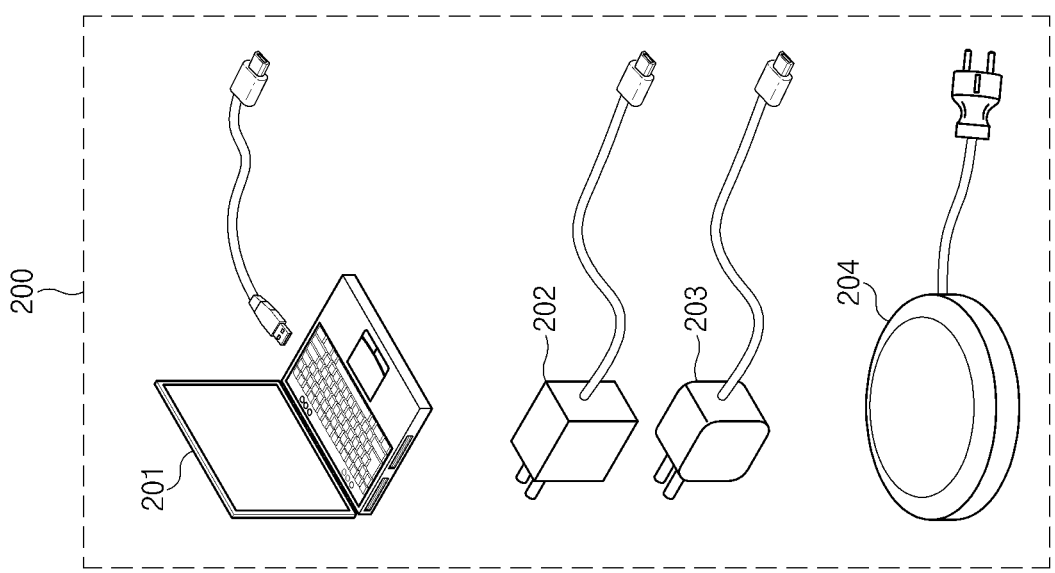

Those of ordinary skill in the art will recognize that modification, equivalent, and/or alternative on the various embodiments of the present disclosure described herein can be made without departing from the scope and spirit of the present disclosure.

In the present disclosure, the expressions "have", "may have", "include", "comprise", "may include", and "may comprise" used herein indicate existence of corresponding features (e.g., elements such as numeric values, functions, operations, or components) but do not exclude the presence of additional features.

In the present disclosure, the expressions "A or B", "at least one of A and/or B", or "one or more of A and/or B", and the like may include any and all combinations of one or more of the associated listed items. For example, the terms "A or B", "at least one of A and B", or "at least one of A or B" may refer to all of the case (1) where at least one A is included, the case (2) where at least one B is included, or the case (3) where both of at least one A and at least one B are included. The term "and/or" covers a combination of a plurality of items, or any of the plurality of items.

The terms such as "first", "second", and the like used herein may refer to various elements of various embodiments of the present disclosure, but do not limit the elements. Furthermore, such terms may be used to distinguish one element from another element. For example, "a first user device" and "a second user device" may indicate different user devices regardless of the order or priority thereof.

When an element (e.g., a first element) is referred to as being "(operatively or communicatively) coupled with/to" or "connected to" another element (e.g., a second element), it may be directly coupled with/to or connected to the other element, or an intervening element (e.g., a third element) may be present. In contrast, when an element (e.g., a first element) is referred to as being "directly coupled with/to" or "directly connected to" another element (e.g., a second element), it should be understood that there are no intervening element (e.g., a third element).

The expression "configured to" used herein may be used interchangeably with the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. The term CPU (central processing unit), for example, a "processor configured to perform A, B, and C", may mean a dedicated processor (e.g., an embedded processor) for performing a corresponding operation or a generic-purpose processor (e.g., a CPU or an application processor (AP)) which may perform corresponding operations by executing one or more software programs which are stored in a memory device.

Terms used in the present disclosure are used to describe specified embodiments and do not limit the scope of the present disclosure. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are defined in the specification, they are not to be interpreted to exclude embodiments of the present disclosure.

An electronic device according to various embodiments of the present disclosure may include at least one of smartphones, tablet PCs, mobile phones, video telephones, e-book readers, desktop PCs, laptop PCs, netbook computers, workstations, servers, personal digital assistants (PDAs), portable multimedia players (PMPs), motion picture experts group (MPEG-1 or MPEG-2) audio layer 3 (MP3) players, mobile medical devices, cameras, wearable devices (e.g., head-mounted-devices (HMDs) and electronic glasses), an electronic apparel, electronic bracelets, electronic necklaces, electronic accessories, electronic tattoos, smart watches, and the like.

According to embodiments of the present disclosure, the electronic devices may be home appliances. The home appliances may include at least one of, for example, televisions (TVs), digital versatile disc (DVD) players, audio players, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, or the like.

According to embodiments of the present disclosure, the photographing apparatus may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices), navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or Internet of things (IoT) devices (e.g., light bulbs, various sensors, electric or gas meters, sprinkler devices, fire alarms, thermostats, street lamps, toasters, exercise equipment, hot water tanks, heaters, boilers, and the like).

According to embodiments of the present disclosure, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic device may be one of the above-described devices or a combination thereof. An electronic device may be a flexible device. Furthermore, an electronic device may not be limited to the above-described electronic devices and may include other electronic devices and new electronic devices according to the development of technologies.

The term "user" used herein may refer to a person who uses an electronic device or may refer to a device (e.g., an artificial intelligence electronic device) that uses an electronic device.

FIG. 1 illustrates a battery charging station according to an embodiment of the present disclosure.

Referring to FIG. 1, a battery charging station 10 of the present disclosure may include, for example, an electronic device 100 equipped with a battery 140 and a charging device 200 capable of charging the electronic device 100.

The charging device 200 may have a form in which one side thereof includes a cable capable of being electrically connected with the electronic device 100 and which is provided with a cord or the like in which the other side thereof is connected with a power supply. Alternatively, the charging device 200 may be capable of supplying power to the electronic device 100 while a cable is connected with an external electronic device capable of supplying the power. The charging device 200 may include a first type charger 201, a second type charger 202 (e.g., a travel adaptor (TA)), a third type charger 203, and a wireless charger 204

The first type charger 201 may include the external electronic device capable of supplying power to the electronic device 100. For example, the first type charger 201 may include a notebook computer, a laptop computer, or the like that includes a battery. Alternatively, the first type charger 201 may include an electronic device such as a smartphone, a slate PC, a tablet PC, or the like. An external charging device (e.g., the charging device 200) may be connected to the electronic device 100 through a cable and may supply the power stored in a battery to the electronic device 100. In this operation, the first type charger 201 may supply power that is relatively lower than, for example, other types of chargers. For example, in the case where the second type charger 202 is capable of supplying charging power of 10 W (5 V*2 A), the first type charger 201 may supply charging power of 4.5 W (5 V*0.9 A) or 2.5 W (5 V*0.5 A). According to various embodiments of the present disclosure, the first type charger 201 may have a charging downstream port (CDP) that is capable of supplying the charging power up to a maximum 4.5 W (5 V*0.9 A) while transmitting data depending on a universal serial bus (USB) Battery charging specification version 1.2 (e.g., BC 1.2), or a standard downstream port (SDP) that is capable of supplying the charging power up to a maximum 2.5 W (5 V*0.5 A) while transmitting data. The maximum charging power may vary depending on the manufacturer and the USB version. Hereinafter, a device that supplies charging power that is lower than the third type charger 203, or than the second type charger 202 in some cases, may be taught as the first type charger 201.

For example, the second type charger 202 may charge the battery 140 of the electronic device 100 at a specified first speed, a normal speed, or by using charging power of a first magnitude (e.g., 10 W (5 V*2 A)) during a specified time. The third type charger 203 may charge the battery 140 at a specified second speed, a high speed, or by using charging power of a second magnitude (e.g., 15 W (9 V*1.67 A)), greater than the first magnitude during a specified time. In this regard, the third type charger 203 may include a communication circuit. When the electronic device 100 is charged, the third type charger 203 may communicate with the electronic device 100 to supply the necessary charging power, which is needed for the electronic device 100, depending on the charging function (e.g., a normal speed charging function or a high-speed charging function) of the electronic device 100. According to various embodiments of the present disclosure, the communication between a charger and an electronic device may operate based on a specified protocol (e.g., a charging protocol such as USB power delivery specification, Samsung adaptive fast charging (AFC), Qualcomm Quick Charge (QC), or the like) using the data pin (e.g., D+/D− or a configuration channel (CC) in the case of Type C) of a USB port. Hereinafter, a charger that supplies charging power smaller than the third type charger 203 may be referred to as the second type charger 202.

For example, the wireless charger 204 may include a charging device capable of wirelessly charging the electronic device 100. In this regard, the wireless charger 204 may include a power transmitter coil that is aligned with a wireless charging coil disposed to charge the battery 140 of the electronic device 100 and may wirelessly supply power to the electronic device 100 by using a coil.

After the battery 140 is seated in the electronic device 100, the electronic device 100 may turn on a display 160 by using the power supplied by the battery 140, may execute a user function according to a user input, or according to specified scheduling information. In this regard, the electronic device 100 may include a housing 103, the display 160, and a charging interface 170. Alternatively, the electronic device 100 may further include various elements, for example, an AP associated with the operation of the display 160, a communication processor (CP), an antenna, a camera, an audio input/output device, and the like, which are associated with the operation of a user function, in the housing 103.

At least part of the housing 103 may surround the edge of the display 160, and various elements (e.g., the processor, the audio input/output device, and the like) associated with driving the display 160 may be seated inside thereof. At least part of the housing 103 may be formed of a metallic material or at least part of the housing 103 may be formed of a nonmetallic material. For example, a wired charging interface 101 (e.g., a connector of USB Type B, USB Type C, or the like) associated with the charging of the battery 140 may be disposed in one side (e.g., a side wall of a lower end) of the housing 103. According to various embodiments of the present disclosure, a wireless charging interface 102 associated with wireless charging may be disposed in the other side (e.g., a rear surface, in the case where a surface on which the display 160 is disposed on a front surface) of the housing 103. The wireless charging interface 102 may be disposed inside the rear surface of the housing 103.

The display 160 may output a screen according to the execution of a specified user function. According to an embodiment of the present disclosure, the display 160 may output a screen including information about the state of the battery 140. For example, the display 160 may output a screen including information indicating the state of charge (SOC) (e.g., the state of an amount of charge indicating how much the battery 140 is charged) of the battery 140, a type of the charging device 200, whether the charging device 200 associated with the charging of the battery 140 is connected, whether the battery 140 is being charged, or the like. The display 160 may output a charging limit timer object 161 or an image. The charging limit timer object 161 may be an object including information for limiting the charging of the battery 140. The charging limit timer object 161 may be displayed during charging. Alternatively, if a charging limit timer ends, the charging limit timer object 161 may be temporarily displayed on the display 160. Additionally or selectively, the display 160 may output action guide information (e.g., a text or an image as information for guiding reconnection after the charging device 200 is detached) to be executed when the charging limit timer ends. Information associated with the operation of the charging limit timer may be output as audio information through an audio device (e.g., a speaker) of the electronic device 100.

When the battery 140 is being charged depending on the connection of the charging device 200, the electronic device 100 may set the driving time of the charging limit timer that limits the charging of the battery 140, based on at least one of the physical or electrical characteristic of the charging device 200 or the battery 140, and the charging environment of the battery 140.

Figure 2:
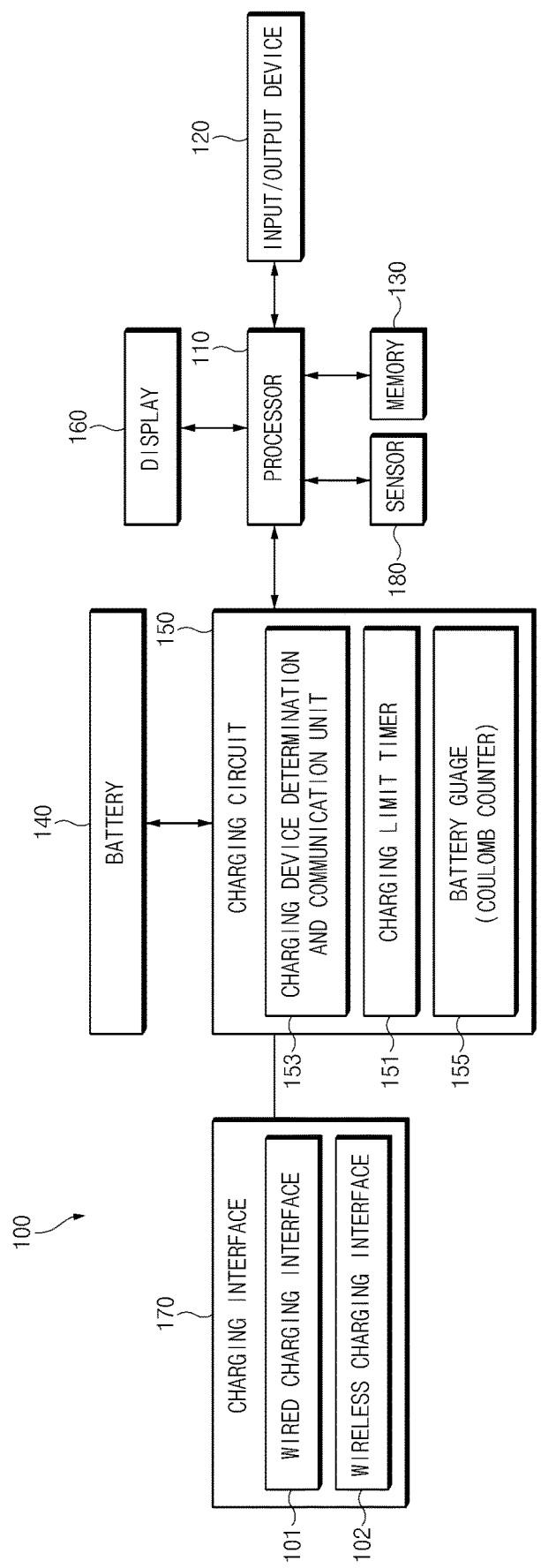
FIG. 2 is a block diagram illustrating an example of a configuration of an electronic device according to an embodiment of the present disclosure.

FIG. 2 is a block diagram illustrating a configuration of an electronic device according to an embodiment of the present disclosure.

Referring to FIG. 2, the electronic device 100 may include a processor 110, an input/output device 120, a memory 130, the battery 140, a charging circuit 150, the display 160, the charging interface 170, and a sensor 180.

The processor 110 may transfer and process a signal associated with the functional operation of the electronic device 100. The processor 110 may control logic and may include an embedded processor of a component (e.g., a power management integrated circuit (PMIC)) performing a specific function as well as a general-purpose processor such as an AP. According to an embodiment of the present disclosure, the processor 110 may control the charging of the battery 140. For example, the processor 110 may control the time setting of a charging limit timer 151 included in the charging circuit 150. Alternatively, the processor 110 may transmit a control signal associated with the time setting of the charging limit timer 151 to the charging circuit 150. The processor 110 may transmit the control signal to the charging circuit 150 to make the time setting of the charging limit timer 151 different based on at least one of the type of the charging device 200 connected for charging battery 140, the magnitude of charging power (e.g., charging current) that the charging device 200 supplies, a charging speed, a type of a charging device, a charging frequency of the battery 140, the number of days elapsed from the day of manufacture of the battery 140, outside temperature or inside temperature of the electronic device 100, the SOC of a battery (e.g., an amount of charge) at a point in time when the charging is started, or the internal resistance or impedance of a battery.

The processor 110 may communicate with a charging device connected to the charging interface 170 or may verify the type of the charging device 200 or obtain information for the type of the charging device 200 through the detection of a specified signal. Alternatively, the processor 110 may count a charging frequency whenever the battery 140 is charged and may store the corresponding count in a specified memory area or a specified register. Alternatively, the processor 110 may collect information about battery charging frequency from a tag in which information about the charging frequency is written and which is attached in one side of the battery 140. According to an embodiment of the present disclosure, the battery charging frequency and information about the battery may be stored in the battery 140. The processor 110 may collect information about an outside temperature or an inside temperature from a temperature sensor that is attached on the inner surface or the outer surface of the electronic device 100. The processor 110 may obtain information about the amount of charge remaining in battery 140 by using the charging circuit 150.

If the charging limit timer 151 ends, the processor 110 may control the charging circuit 150 such that the charging of the battery 140 is stopped. The processor 110 may output guide information for guiding the termination of the charging limit timer 151 through the display 160 or an audio device. According to various embodiments of the present disclosure, the processor 110 may output guide information (e.g., information for requesting reconnection after the charging device 200 is detached) for directing recharging, depending on the termination of the charging limit timer 151. If the charging limit timer 151 ends, the processor 110 may restart the charging limit timer 151 at a specified frequency. If a restart frequency is a specified frequency, the processor 110 may control the charging circuit 150 such that the charging ends until the charging device 200 is physically detached and reconnected. In this operation, the processor 110 may output information for guiding the occurrence of an abnormality associated with battery charging after the charging ends. The restart frequency may be set to a range from 0 to five times depending on a policy. For example, in the case where there is no restart policy of the charging limit timer 151, the processor 110 may control the charging circuit 150 such that a charging operation is not restarted until the detachment and reconnection of a charger, without the restart of the charging limit timer 151 even though the amount of charge is reduced below a specific magnitude depending on the discharging of a battery. The processor 110 may adjust the number of restarts of the charging limit timer 151 depending on the amount of charge. Alternatively, the processor 110 may control the charging circuit 150 such that the charging operation is stopped, and depending on the number of restarts of the charging limit timer 151 restarted within a specified time.

The input/output device 120 may include a device associated with a user input of the electronic device 100. For example, the input/output device 120 may include various input means such as button, keypad, touch key, touchscreen, and the like. The input/output device 120 may generate a user input signal configured such that a message associated with the driving of the charging limit timer 151 is output to the display 160, a user input signal associated with the removal of the message output to the display 160, and a user input signal associated with the time setting of the charging limit timer 151, in response to a user input. The above-described user input signal may be transferred to the processor 110 and may be applied to the function execution according to the type and contents of the corresponding input signal.

The memory 130 may store at least one application associated with a function operation of the electronic device 100, data according to an application execution, or the like. According to an embodiment of the present disclosure, the memory 130 may store an application associated with the time setting the start of the charging limit timer 151. The charging-related application may include at least one instruction set of an instruction set (e.g., a routine, a function, or the like) for receiving a charging input when the charging device 200 is connected to the charging interface 170, an instruction set for collecting the physical or electrical characteristic of the battery 140, an instruction set for collecting battery charging frequency information, an instruction set for obtaining information of the type of the charging device 200, an instruction set for collecting temperature information (e.g., the outside temperature or inside temperature of the electronic device 100) upon battery charging, or an instruction set for collecting the amount of charge of the battery 140. Whenever the battery 140 is charged, the memory 130 may accumulate and store a charging frequency. Alternatively, the memory 130 may store information about the manufacturing date of the battery 140, or the like.

The battery 140 may be disposed in at least one of the inside or outside of a housing of the electronic device 100 and may supply power under control of the charging circuit 150 or under control of the processor 110. Since the battery 140 is embedded inside the electronic device 100, the battery 140 may not be replaceable. Alternatively, the battery 140 may be replaceable with another battery. An electrical or physical characteristic of the battery 140 may change depending on the number of discharges or time since the manufacturing date of the battery 140. Alternatively, if a charge-discharge frequency is greater than or equal to a specified frequency, at least one of the maximum charging capacity, charging efficiency, and charging stability of the battery 140 may gradually decrease. Alternatively, the charging characteristic (e.g., the maximum charging capacity) of the battery 140 may change depending on an inside or outside temperature.

The one-time charging of the battery 140 may include the case where the charge quantity in the battery 140 is charged from "0" to a specified quantity (e.g., a battery capacity such as 3000 mAh based on 4 V). Alternatively, the one-time charging and one-time discharging of the battery 140 (e.g., charging by 3 Ah and discharging by 3 Ah) may be defined as 1 charging cycle. As such, in the case where the capacity of the battery 140 is 3 Ah, the electronic device 100 may calculate the accumulated amount of charge, which may be 10800 coulomb (C) upon charging and 10800 C upon discharging, as 1 charging cycle regardless of the amount of charge. In this regard, the electronic device 100 may include a coulomb counter in the charging circuit 150. The electronic device 100 may count a current charged from the charging device 200 by 1 coulomb or may count a current discharged from the battery 140 by 1 coulomb, for the purpose of determining 1 cycle.

The charging circuit 150 may include a charging device determination and communication unit 153, the charging limit timer 151, and a battery gauge 155.

The charging device determination and communication unit 153 may distinguish wireless/wired charging, may distinguish SDP, CDP, and dedicated charging port (DCP) through BC 1.2, may distinguish fast charging TA through communication, and may distinguish Type C through power delivery (PD) communication. The SDP may be a normal USB port, and may include a charging port that is capable of charging up to, for example, 5 V/500 mA. The CDP may be a port for USB communication while a battery is charged and may include a port that is capable of charging up to, for example, 5 V/0.9 A. The DCP may be a port connected to a charger (e.g., TA) and may include a port that is capable of charging up to, for example, 5 V at 2 A. In an embodiment of the present disclosure the charging power or chargeable capacity may be different for each manufacturer.

If the charging device 200 is connected to the electronic device 100, the charging device determination and communication unit 153 may classify the type of a power source by a power input. For example, the charging device determination and communication unit 153 may determine whether the power is input from a wireless input port or the power is input from a wired input port. If it is determined that a connection port is a USB Type-C port and the power is input from the wired input port or the wired charging interface, the charging device determination and communication unit 153 may determine whether a Type-C connector is connected by using the CC pin. In the case where the connection port is the Type-C connector, the charging device determination and communication unit 153 may perform USB PD communication through the CC pin to negotiate charging power between the electronic device 100 and the charging device 200. In the case where the connection port is not the Type-C connector, the charging device determination and communication unit 153 may determine that the connection port is an existing USB connector (e.g., micro USB), or the like. If it is determine that the existing USB connector is connected, the charging device determination and communication unit 153 may apply a high signal (e.g., 0.6 V) to a D+ line to obtain information of a feedback signal of a D− line. If the feedback signal of the D− line is in a high state (e.g., over 0.3 V), the charging device determination and communication unit 153 may determine that the connected charger is a CDP or DCP device. If not (e.g., if the feedback signal of the D− line is in a low state (e.g., below 0.3 V)), the charging device determination and communication unit 153 may determine that the connected charger is a SDP device. To distinguish a type of the connected charger, for example, the CDP and the DCP, the charging device determination and communication unit 153 may apply a high signal (e.g., 0.6 V) to the D− line to obtain information of the feedback signal of a D+ line. If the feedback signal of the D+ line is in a high state (e.g., over 0.3 V), the charging device determination and communication unit 153 may determine that the connected charger is the DCP device. If not, the charging device determination and communication unit 153 may determine that the connected charger is the CDP device.

If it is determined that the connected charger is the DCP device, the charging device determination and communication unit 153 may further determine whether the DCP device is a normal charging device or the DCP device is a fast charging device. In the case where the DCP device is the normal charging device, the D+ pin and the D− pin are shorted in the charging device. Accordingly, if sensing the voltage of the D+/D− pin, the charging device determination and communication unit 153 may recognize a voltage of the same level. In the case where the DCP device is the fast charging device, the voltage of the D+/D− pin sensed by an electronic device may be different while the D+/D− pin is shorted initially and then is opened after a specific time. The charging device determination and communication unit 153 may determine whether the charging device 200 is a normal charging device or the charging device 200 is a fast charging device capable of communication based on the above-described condition. In the case where the DCP device is the fast charging device, the charging device determination and communication unit 153 may negotiate the charging voltage and current with an electronic device by performing packet communication using a data pin or exchanging the premised voltage level. The charging device determination and communication unit 153 may notify a processor of the type of a charging device, and the processor may control a charging limit time depending on the type of the charging device. As described above, if the charger is connected, the charging device determination and communication unit 153 may sense a Vbus port, may determine whether the charger is the Type-C charger, may obtain information of the type of the charger through the connection and disconnection of the D+ and D− pins, and may determine whether the type of the charger is a quick or normal charger, through the control of D+ and D− pins.

The battery gauge 155 may include a device or logic for recognizing the SOC (e.g., an amount of charge) of a battery, based on the sensing of charge-discharge current quantity, the sensing of a battery voltage, a temperature, or the like. For example, the battery gauge 155 may include a coulomb counter that detects the current quantity of a charging current.

According to various embodiments of the present disclosure, if the charging device 200 is connected to the charging interface 170, the battery 140 may be charged by using power provided by the charging device 200. The charging circuit 150 may control the setting of the charging limit timer 151 associated with the charging of the battery 140 under control of the processor 110 or depending on settings embedded in the device 100. For example the charging circuit 150 may receive information corresponding to at least one of the electrical or physical characteristic of the charging device 200 or the battery 140 and the charging environment of the battery 140 from the processor 110, or may obtain the corresponding information from a sub-memory that is separately managed, and may set or allow the setting time of the charging limit timer 151 based on the information. The charging circuit 150 may set or allow the setting time of the charging limit timer 151 depending on the charging cycle. Alternatively, the charging circuit 150 may set or allow the setting time of the charging limit timer 151 depending on an outside temperature or inside temperature. Alternatively, the charging circuit 150 may set or allow the setting time of the charging limit timer 151 depending on the type of a charging device (e.g., quick charger, normal charger, wireless charger, USB charger, or the like). Alternatively, the charging circuit 150 may set or allow the setting time of the charging limit timer 151 based on the year of manufacture (e.g., a serial number, the launch date of a user, or the like) of the battery 140. Alternatively, the charging circuit 150 may set or allow the setting time of the charging limit timer 151 depending on the amount of charge of the battery 140. Alternatively, the charging circuit 150 may set or allow the setting time of the charging limit timer 151 depending on the internal resistance or impedance of the battery 140.

According to various embodiments of the present disclosure, the charging circuit 150 may set the setting time of the charging limit timer 151 based on the combination of the above-described conditions. For example, when a specific outside temperature or inside temperature is greater than or equal to a specified value, the charging circuit 150 may distinguish the type of the charging device 200 and may set the setting time of the charging limit timer 151 depending on the type of the charging device 200. Alternatively, in the case where the number of charging cycles of the battery 140 is greater than or equal to a specified value, the charging circuit 150 may distinguish the type of the charging device 200 and may set the setting time of the charging limit timer 151 depending on the distinguished result. Alternatively, even when the connected charging device 200 is a quick charger, the charging circuit 150 may obtain information of the outside temperature and the inside temperature, and may set the setting time of the charging limit timer 151 depending on the corresponding temperature. Alternatively, in the case where the year of manufacture of the battery 140 is more than a specified time and the charging device associated with a fast charging is connected, the charging circuit 150 may set the setting time of the charging limit timer 151. The above-described charging limit timer 151 may be first set at a point in time when charging power is input (e.g., the insertion of the charging device 200, or the like). If the charging device 200 is removed, the charging limit timer 151 may be reset or initialized. Alternatively, after the charging device 200 is removed, if the charging device 200 is connected again, the setting time of the charging limit timer 151 may be reset depending on the condition of the corresponding charging device 200 when it is connected.

According to various embodiments of the present disclosure, in the case where the electrical or physical characteristics of the battery 140 are not good or the battery charging environment is relatively poor, the charging circuit 150 may set the charging current to be low. Accordingly, to compensate for the increased charging time, the charging circuit 150 may set the setting time of the charging limit timer 151 to be relatively longer. Alternatively, in the case where the electrical or physical characteristics of the battery 140 are good or the battery charging environment is relatively good, the charging circuit 150 may set the setting time of the charging limit timer 151 to be relatively shorter. With the above description, the charging circuit 150 may prevent an excessive charging state from occurring in the battery 140 by a leakage current or the like, thereby preventing an issue such as the burnout or ignition of a battery.

The display 160 may output at least one screen associated with the functional operation of the electronic device 100. For example, if the charging input is received depending on the connection of the charging device 200, the display 160 may output a screen including an object corresponding to the reception of the corresponding input. Alternatively, the display 160 may output at least one of information about a type of the charging device 200, frequency information of a charging cycle, information about the SOC (e.g., an amount of charge), information about an outside temperature or inside temperature, information about the year of manufacture of a battery, or information about the setting time or the remaining time of the charging limit timer 151.

The charging interface 170 may include a connection interface to which the charging device 200 is connected. For example, the charging interface 170 may include a wired charging interface 101, to which a USB device, micro USB device, or a TA is connected by wire, and the wireless charging interface 102 that is capable of receiving power from a wireless charging device.

The sensor 180 may include a temperature sensor associated with the measurement of an inside or outside temperature of the electronic device 100. For example, at least one temperature sensor may be disposed in one side of the interior of the electronic device 100, which is adjacent to the battery 140. Alternatively, the temperature sensor may be disposed in one side of the surface of the housing 103 of the electronic device 100 or may be disposed at a location spaced apart from the battery 140 by a specified distance.

According to various embodiments of the present disclosure, an electronic device according to an embodiment may include a battery 140 to supply the power to the electronic device, a charging circuit 150 to charge the battery, and a processor 110. The processor may be configured to obtain context information associated with charging of the battery, if the context information satisfies a first specified condition (e.g., in the case where a first condition is satisfied), to set a timer associated with a charging time of the charging circuit to a first time, if the context information satisfies a second specified condition (e.g., in the case where a first condition is not satisfied), to set the timer to a second time different from the first time, and to charge the battery by using the charging circuit during a corresponding time of the first time and the second time.

According to various embodiments of the present disclosure, the processor may be configured to obtain the context information in response to occurrence of a specified event (e.g., the reception of a charging-related input or a software input of a user, menu selection, an input for inserting a charger into a charging interface, an input for directing the execution of a charging operation after the charger is connected, or the like).

According to various embodiments of the present disclosure, the processor may be configured to sense connection between the electronic device and an external power device as at least part of the specified event.

According to various embodiments of the present disclosure, the processor may be configured to sense a user input to the electronic device as at least part of the specified event.

According to various embodiments of the present disclosure, the processor may be configured to obtain information of the type of an external power device connected to the electronic device as at least partial information of the context information.

According to various embodiments of the present disclosure, the processor may be configured to obtain information of a power capacity capable of being supplied through an external power device connected to the electronic device as at least partial information of the context information.

According to various embodiments of the present disclosure, the processor may be configured to obtain information of a charging frequency of the battery, a charging speed of the battery, a state of charge of the battery, or an inside temperature or an outside temperature of the electronic device as at least partial information of the context information.

According to various embodiments of the present disclosure, the processor may be configured to provide notification information corresponding to an operation of limiting the charging of the electronic device.

According to various embodiments of the present disclosure, an electronic device according to an embodiment may include a housing 103, a battery 140 disposed inside the housing, a charging interface 170 disposed in one side of the housing, and a charging circuit 150 controlling charging of the battery and the charging interface. The charging circuit may be configured, if a charging device is connected to the charging interface, to collect at least one factor associated with a battery charging environment and to change a setting time of a charging limit timer limiting the battery charging depending on the at least one factor.

According to various embodiments of the present disclosure, the processor may be configured to provide information corresponding to an operation of limiting the charging of the electronic device.

According to various embodiments of the present disclosure, an electronic device may include a housing, a battery disposed inside the housing, a charging interface disposed in one side of the housing, and a charging circuit controlling charging of the battery and the charging interface. The charging circuit may be configured, if a charging device is connected to the charging interface, to collect at least one factor associated with a battery charging environment and to set a setting time of a charging limit timer limiting the battery charging depending on the at least one factor.

According to various embodiments of the present disclosure, the charging circuit may make a setting time of the charging limit timer different depending on at least one of a charging cycle of the battery, the SOC (e.g., an amount of charge) of the battery at the start of charging, the magnitude of a charging current or the charging speed that the charging device supplies, the outside temperature or inside temperature of the electronic device, the number of days elapsed from the manufacturing date of the battery, or the internal resistance or impedance of the battery.

According to various embodiments of the present disclosure, the charging circuit may calculate and store the battery charging cycle whenever the battery is charged, and may set the setting time of the charging limit timer to be short, because the maximum battery charging capacity is reduced as the number of charging cycles of the battery increases.

According to various embodiments of the present disclosure, in the case where a function to reduce the magnitude of a charging current based on the number of charging cycles is applied, the charging circuit may maintain the setting time of a charging limit timer to be the same as the previous setting time or may set the setting time of a charging limit timer to be longer than the previous setting time, even though the number of charging cycles of the battery increases.

According to various embodiments of the present disclosure, since a charging current control operation is applied as the outside temperature of the electronic device increases, a charging time may increase. In the case, the charging circuit may set the setting time of the charging limit timer to be longer.

According to various embodiments of the present disclosure, in an interval to which the charging current control operation is not applied, since the impedance of a battery decreases as the outside temperature of the electronic device increases, the charging time of the battery may decrease. In the case, the charging circuit may set the setting time of the charging limit timer to be short.

According to various embodiments of the present disclosure, as the magnitude of the charging current increases, the charging circuit may set the setting time of the charging limit timer to be short.

According to various embodiments of the present disclosure, as the ratio of the amount of charge increases, the charging circuit may set the setting time of the charging limit timer to be short.

Figure 3:
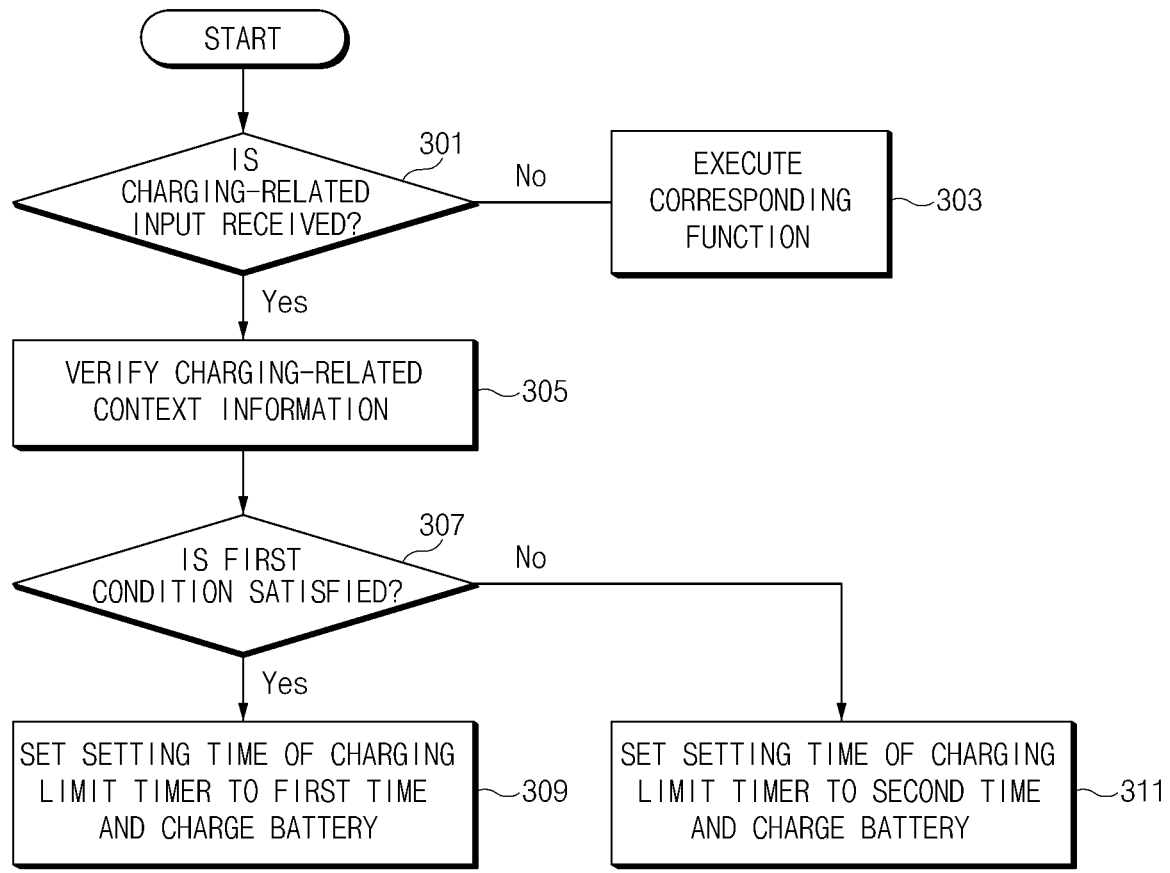
FIG. 3 is a flowchart illustrating a battery charging method associated with a charging station according to an embodiment of the present disclosure.

FIG. 3 is a flowchart illustrating a battery charging method associated with a charging station according to an embodiment of the present disclosure.

Referring to FIG. 3, with regard to the battery charging method, in step 301, the charging circuit 150 or an embedded processor such as the processor 110, a controller, a PMIC, or the like, may determine whether a charging-related input is received. In this regard, a pull-up voltage may be set with respect to the charging interface 170, a port, or a connector. If the charging device 200 is inserted into the charging interface 170, the charging circuit 150 may verify the connection of the charging device 200 or obtain information status of the connection of the charging device 200 based on the transmission of a specified signal and a feedback signal (e.g., the charging-related input).

If the charging-related input is not received, in step 303, the charging circuit 150 may execute a corresponding function according to the scheduled information. For example, the charging circuit 150 may transmit the power of the battery 140 to the processor 110. According to various embodiments of the present disclosure, the charging circuit 150 may periodically monitor whether a charging input is generated.

If the charging-related input is received, in step 305, the charging circuit 150 may verify or obtain charging-related context information. For example, the charging circuit 150 may collect information about the charging cycle of the battery 140, the SOC (e.g., an amount of charge) of the battery 140, information about the time lapse since the manufacturing date of the battery 140, outside temperature information, or the like.

In step 307, the charging circuit 150 may determine whether the verified charging-related context information satisfies a specified first condition. When the first condition is satisfied, in step 309, the charging circuit 150 may set the setting time (e.g., a time when a timer ends) of the charging limit timer 151 to a first time and may charge the battery 140. For example, in the case where the number of charging cycles of a battery is less than a specified frequency (e.g., about 300 times), the charging circuit 150 may set the setting time of the charging limit timer 151 to the first time.

In the case where the first condition is not satisfied or in the case where the specified second condition is satisfied, in step 311, the charging circuit 150 may set the setting time of the charging limit timer 151 to a second time and may charge the battery 140. For example, in the case where the number of charging cycles of the battery is greater than or equal to the specified frequency, the charging circuit 150 may set the setting time of the charging limit timer 151 to the second time. For example, the second time may include a time less than the first time. According to an embodiment of the present disclosure, since the increase in the number of charging cycles reduces the battery capacity, a charging time may be relatively reduced in the case where a battery is continuously charged with the same charging current. As such, as the charging cycle increases, the charging circuit 150 may set the setting time of the charging limit timer 151 to be shorter. In the case where a specified function to manage a battery (e.g., a function to decrease the fully charged voltage and the charging current as the increase in the number of charging cycles reduces the battery capacity) is applied, the charging time may be the same or may increase. As such, in the case where the specified function to manage a battery is applied, the charging circuit 150 may maintain the setting time of the charging limit timer 151 to be the same as the previous setting time or may set the setting time of the charging limit timer 151 to be longer than the previous setting time.

Figure 4:
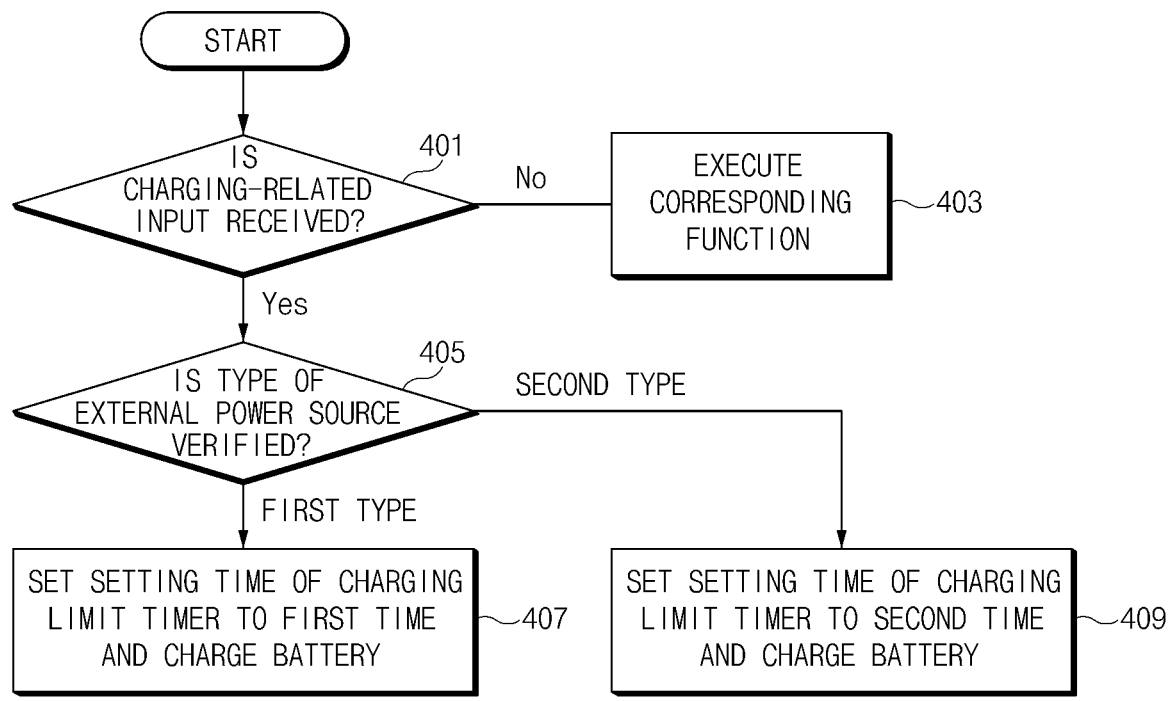
FIG. 4 is a flowchart illustrating a battery charging method according to a type of external power according to an embodiment of the present disclosure.

FIG. 4 is a flowchart illustrating a battery charging method according to a type of external power according to an embodiment of the present disclosure.

Referring to FIG. 4, with regard to the battery charging method, in step 401, the charging circuit 150 may determine whether a charging-related input is received. As described above, the charging-related input may include a signal input generated when the charging device 200 is connected to the charging interface 170.

If the charging-related input is not received, in step 403, the charging circuit 150 may execute a corresponding function according to the scheduled information. For example, the charging circuit 150 may transmit the power of the battery 140 to the processor 110. According to various embodiments of the present disclosure, the charging circuit 150 may periodically monitor whether a charging input is generated.

If the charging-related input is received, in step 405, the charging circuit 150 may obtain information of the type of an external power source. In this regard, the charging circuit 150 may operate various modes capable of determining the type of the external power source (e.g., the charging device 200). For example, the charging circuit 150 may obtain information of the type of the connected charging device 200 depending on the magnitude of a pull-up voltage changed by the connection of the charging device 200. Alternatively, if the charging device 200 is connected to the charging interface 170, the charging circuit 150 may transmit a specified signal and may determine the type of the charging device 200 depending on the form of the feedback signal. Alternatively, the charging circuit 150 may perform communication (e.g., PD communication) with the charging device 200 connected to the charging interface 170 and may determine the type of the charging device 200.

According to an embodiment of the present disclosure, if the charging device 200 is connected, the charging circuit 150 (e.g., the charging device determination and communication unit 153) may sense a Vbus port, may determine whether the charging device 200 is the Type-C charger, may obtain information of the type of the charging device 200 through the connection and disconnection of the D+ and D− pins, and may determine whether the type of the charging device 200 is a quick or normal charger, through the control of D+ and D− pins. In the case where the type of the external power source is a first type, in step 407, the charging circuit 150 may set the setting time of the charging limit timer 151 to a first time and may charge the battery 140. In the case where the type of the external power source is a second type, in step 409, the charging circuit 150 may set the setting time of the charging limit timer 151 to a second time different from the first time and may charge the battery 140.

The charging circuit 150 may perform charging based on the charging device 200 connected to the charging interface 170. If the charging is completed before the charging limit timer 151 ends, the charging circuit 150 may stop charging the battery. In this operation, the charging circuit 150 may end the charging limit timer 151 in response to the termination of the battery charging. After the charging device 200 is physically detached, if the charging device 200 is connected again, the charging limit timer 151 may be reset and then may be restarted. In the case where the number of times that the charging ends by the charging limit timer 151 during a specified time (e.g., one hour, one day, etc.) is greater than or equal to a specified frequency during a specified time (e.g., one day), the charging circuit 150 may interrupt an additional charging operation, may output guide information associated with an issue occurrence of a charging circuit (e.g., to a display or an audio device), and may transmit information associated with the issue occurrence of a charging circuit to a specified server. For example, the charging circuit 150 may output guide information about the abnormality of the battery 140, guide information for requesting the repair of the battery 140, or the like. According to various embodiments of the present disclosure, in the case where the electronic device 100 executes a specified function (e.g., in the case where the display 160 changes from a turn-off state to a turn-on state), the charging circuit 150 may pause the charging limit timer 151. If the execution of the specified function ends (e.g., if the turned-on display 160 is turned off), the charging circuit 150 may drive the paused charging limit timer 151 again.

Figure 5:
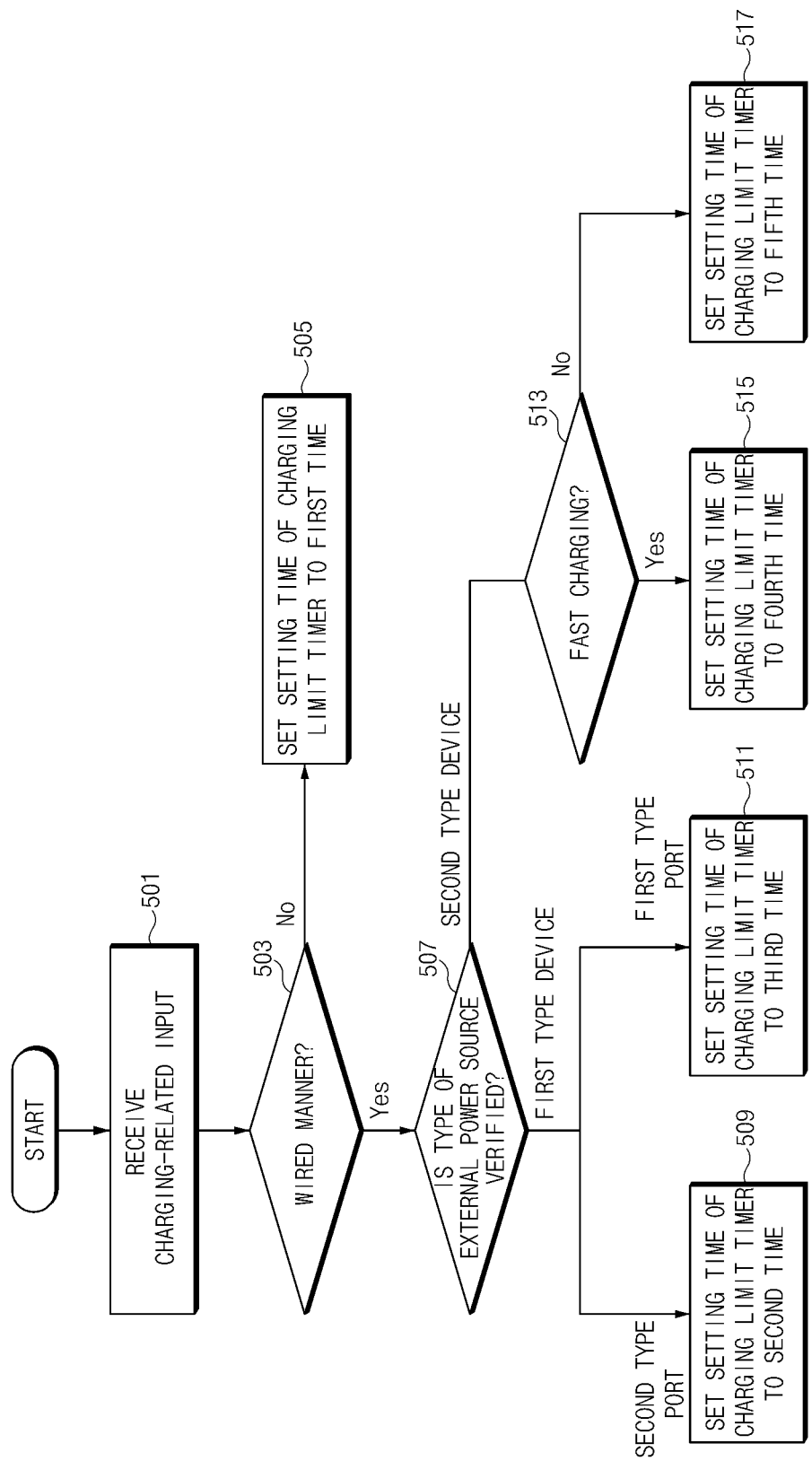
FIG. 5 is a flowchart illustrating a battery charging method according to a type of external power according to an embodiment of the present disclosure.

FIG. 5 is a flowchart illustrating a battery charging method according to a type of external power according to an embodiment of the present disclosure.

Referring to FIG. 5, with regard to the battery charging method, in step 501, the charging circuit 150 may receive a charging-related input.

In step 503, the charging circuit 150 may determine whether the charging-related input is received in a wired manner. For example, the charging circuit 150 may determine whether the charging-related input is received through a Vbus port, or whether a specified signal is received in a transmitter coil associated with wireless charging, to determine whether the charging device 200 operates in the wired manner or the charging device 200 operates in a wireless manner. In the case where the charging device 200 is in a wireless manner, in step 505, the charging circuit 150 may set the setting time of the charging limit timer 151 to a first time. For example, the charging circuit 150 may set the setting time of the charging limit timer 151 to be 5 hours. The first time may be set according to the wireless charging method and may be set depending on the SOC (e.g., an amount of charge). For example, if the amount of charge is 50%, the charging circuit 150 may set the setting time of the charging limit timer 151 to a time (e.g., 2 hours, 3 hours, etc.) less than 5 hours.

In the case where the charging-related input is received through a wire, in step 507, the charging circuit 150 may obtain information of the type of the charging device 200. For example, the charging circuit 150 may determine the type of the charging device 200 based on a detection method (e.g., BC 1.2 detection) associated with the verification of the charging device 200 connected to the charging interface 170. Alternatively, after the connection of the charging device 200, the charging circuit 150 may perform specified communication (e.g., PD communication) to obtain information of the type of the charging device 200. According to an embodiment of the present disclosure, if the charging device 200 is connected, the charging circuit 150 (e.g., the charging device determination and communication unit 153) may determine whether the charging device 200 is the Type-C charger, may obtain information of the type of the charging device 200 through the connection and disconnection of the D+ and D− pins, and may determine whether the type of the charging device 200 is a quick or normal charger, through the control of D+ and D− pins. In the case where the type of the charging device 200 is a first type device and is connected to a first type port, in step 509, the charging circuit 150 may set the setting time of the charging limit timer 151 to a second time. For example, in the case where the charging device 200 supplies power to the first type port (e.g., a port for supplying charging power with 5 V/500 mA) of a power supply device (e.g., a notebook PC or the like) connected by USB, the charging circuit 150 may set the setting time of the charging limit timer 151 to 10 hours. In this operation, the charging circuit 150 may set the setting time of the charging limit timer 151 to a shorter time depending on the SOC (e.g., an amount of charge) of the battery 140.

In the case where the type of the charging device 200 is a first type device and is connected to a second type port, in step 511, the charging circuit 150 may set the setting time of the charging limit timer 151 to a third time. For example, in the case where the charging device 200 supplies power to the second type port (e.g., a port for supplying charging power with 5 V/0.9 A) of a power supply device (e.g., a notebook PC or the like) connected by USB, the charging circuit 150 may set the setting time of the charging limit timer 151 to 5 hours. In this operation, as in the connection of the first type port, the charging circuit 150 may set the setting time of the charging limit timer 151 to a shorter time depending on the SOC or the amount of charge of the battery 140.

If the type of the charging device 200 is a second type device, in step 513, the charging circuit 150 may determine whether the charging device 200 supports a fast charging function. In this regard, the charging circuit 150 may perform communication to determine whether the connected charging device 200 supports the fast charging function. Alternatively, in the case where the charging circuit 150 receives identification information (e.g., identification information indicating that the connected charging device 200 is the charging device having a fast charging function) of the specified device from the connected charging device 200, the charging circuit 150 may determine that the corresponding charging device 200 is the fast charging device.

In the case where the fast charging function is supported, in step 515, the charging circuit 150 may set the setting time of the charging limit timer 151 to a fourth time. For example, the charging circuit 150 may set the setting time of the charging limit timer 151 to 3 hours. In this operation, the charging circuit 150 may set the setting time of the charging limit timer 151 to a time, which is shorter than 3 hours, depending on the amount of charge of the battery 140.

In the case where the fast charging function is not supported, in step 517, the charging circuit 150 may set the setting time of the charging limit timer 151 to a fifth time. For example, the charging circuit 150 may set the setting time of the charging limit timer 151 to 5 hours. In this operation, the charging circuit 150 may set the setting time of the charging limit timer 151 to a time, which is shorter than 5 hours, depending on the amount of charge of the battery 140.

Meanwhile, in the above-mentioned description, it is described that the setting time of the charging limit timer 151 is adjusted depending on a type of the charging device 200. However, embodiments of the present disclosure may not be limited thereto. For example, the charging circuit 150 may adjust the setting time of the charging limit timer 151 depending on the magnitude of charging power that the charging device 200 is capable of supplying. As the charging power or charging current is relatively large, the charging circuit 150 may set the setting time of the charging limit timer 151 to be relatively shorter. As the charging power or charging current is relatively small, the charging circuit 150 may set the setting time of the charging limit timer 151 to be long. While the charging circuit 150 sets the setting time of the charging limit timer 151, the charging circuit 150 may charge the battery 140 by using power that the charging device 200 provides.

Figure 6:
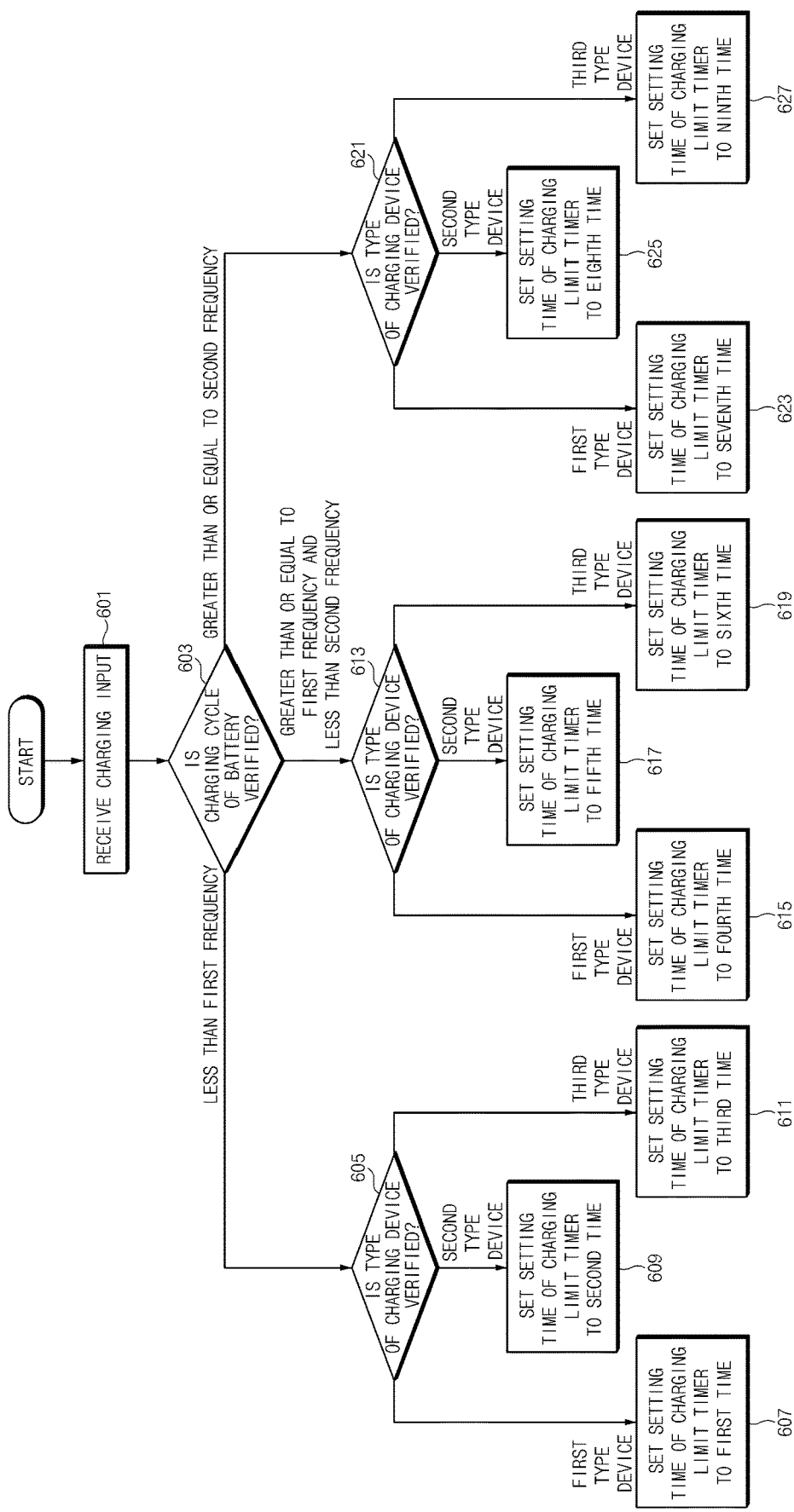
FIG. 6 is a flowchart illustrating a battery charging method associated with a charging cycle according to an embodiment of the present disclosure.

FIG. 6 is a flowchart illustrating a battery charging method associated with a charging cycle according to an embodiment of the present disclosure.

Referring to FIG. 6, with regard to the battery charging method, in step 601, the charging circuit 150 may receive a charging-related input. In step 603, the charging circuit 150 may obtain information of the charging cycle of the battery 140. In this regard, the electronic device 100 may include a counter, a register, a memory, or the like that is capable of recording the charging cycle or may include a register that is capable of recording the charging cycle, in a charging circuit. If at least one of the magnitude of a charging current supplied to the battery 140 and the magnitude of power discharged from the battery 140 is greater than or equal to a specified magnitude, the charging circuit 150 may accumulate and change the charging cycle. Alternatively, in the case where a tag capable of recording the charging cycle of the battery 140 is provided in the battery 140, the charging circuit 150 of the electronic device 100 may record the charging cycle according to the charge/discharge use of the battery 140 in the corresponding tag. As such, the charging circuit 150 may read the tag to obtain information of the current state of the charging cycle of the corresponding battery 140.

In the case where the number of charging cycles of the battery 140 is less than a first frequency, in step 605, the charging circuit 150 may verify the type of the charging device 200. The charging circuit 150 may determine the type of the charging device 200. In the case where the charging device 200 is a first type device, in step 607, the charging circuit 150 may set the setting time of the charging limit timer 151 to a first time. For example, if the number of charging cycles of the battery 140 is less than 300 times and the charging device 200 uses a charging method (e.g., a method that receives the charging power from an electronic device connected by USB) that supplies the relatively low charging power, the charging circuit 150 may set the setting time of the charging limit timer 151 to 10 hours. In this operation, the charging circuit 150 may set the setting time of the charging limit timer 151 to a time that is less than 10 hours or is greater than 10 hours, depending on an amount of charge required to charge the battery 140.

In the case where the charging device 200 is a second type device, in step 609, the charging circuit 150 may set the setting time of the charging limit timer 151 to a second time. For example, in the case where the number of charging cycles of the battery 140 is less than 300 times and the charging device 200 is a device capable of supplying the charging power greater than the first type device or a TA capable of supplying the charging power of a specified magnitude, the charging circuit 150 may set the setting time of the charging limit timer 151 to 5 hours. In this operation, the charging circuit 150 may set the setting time of the charging limit timer 151 to a time that is less than 5 hours or is greater than 5 hours, depending on an amount of charge required to charge the battery 140.

In the case where the charging device 200 is a third type device, in step 611, the charging circuit 150 may set the setting time of the charging limit timer 151 to a third time. For example, in the case where the number of charging cycles of the battery 140 is less than 300 times and the charging device 200 is the TA capable of supplying the charging power of a specified magnitude or more at a high speed, which is greater than or equal to a specified speed or with a charging current of a specified magnitude or more, the charging circuit 150 may set the setting time of the charging limit timer 151 to 3 hours. In this operation, the charging circuit 150 may set the setting time of the charging limit timer 151 to a time that is less than 3 hours or is greater than 3 hours, depending on an amount of charge required to charge the battery 140.

In the case where the number of charging cycles of the battery 140 is greater than or equal to the first frequency or is less than a second frequency, in step 613, the charging circuit 150 may verify a type of the charging device 200. The charging circuit 150 may determine the type of the charging device 200. In the case where the charging device 200 is the first type device, in step 615, the charging circuit 150 may set the setting time of the charging limit timer 151 to a fourth time. For example, in the case where the number of charging cycles of the battery 140 is greater than or equal to 300 times and is less than 500 times, and in the case where the charging device 200 is a device capable of supplying the charging power of 2.5 W (5 V*0.5 A) (e.g., in the manner of receiving the charging power from an electronic device connected by USB), the charging circuit 150 may set the setting time of the charging limit timer 151 to 9 hours and 30 minutes. In this operation, the charging circuit 150 may set the setting time of the charging limit timer 151 to a time that is less than 9 hours and 30 minutes or is greater than 9 hours and 30 minutes, depending on the amount of charge upon charging.

In the case where the charging device 200 is a second type device, in step 617, the charging circuit 150 may set the setting time of the charging limit timer 151 to a fifth time. For example, in the case where the number of charging cycles of the battery 140 is greater than or equal to 300 times and is less than 500 times, and in the case where the charging device 200 is a device (e.g., TA) capable of supplying the charging power of a range from 4.5 W (5 V*0.9 A) to 10 W (5 V*2 A), the charging circuit 150 may set the setting time of the charging limit timer 151 to 4 hours and 30 minutes. In this operation, the charging circuit 150 may set the setting time of the charging limit timer 151 to a time that is less than 4 hours and 30 minutes or is greater than 4 hours and 30 minutes, depending on the amount of charge upon charging.

In the case where the charging device 200 is a third type device, in step 619, the charging circuit 150 may set the setting time of the charging limit timer 151 to a sixth time. For example, in the case where the number of charging cycles of the battery 140 is greater than or equal to 300 times and is less than 500 times, and in the case where the charging device 200 is a device (e.g., a TA supplying the charging current at a high speed or with the charging current of a specified magnitude or more, capable of supplying the charging power of 15 W (9 V*1.67 A), the charging circuit 150 may set the setting time of the charging limit timer 151 to 2 hours and 30 minutes. In this operation, the charging circuit 150 may set the setting time of the charging limit timer 151 to a time that is less than 2 hours and 30 minutes or is greater than 2 hours and 30 minutes, depending on the amount of charge required to charge the battery 140.

In the case where the number of charging cycles of the battery 140 is greater than or equal to the second frequency, in step 621, the charging circuit 150 may verify the type of the charging device 200. The charging circuit 150 may determine the type of the charging device 200. In the case where the charging device 200 is the first type device, in step 623, the charging circuit 150 may set the setting time of the charging limit timer 151 to a seventh time. For example, in the case where the number of charging cycles of the battery 140 is greater than or equal to 500 times and the charging device 200 is a device supplying the charging power of a first magnitude, the charging circuit 150 may set the setting time of the charging limit timer 151 to 9 hours. In this operation, the charging circuit 150 may set the setting time of the charging limit timer 151 to a time that is less than 9 hours or is greater than 9 hours, depending on the amount of charge upon charging.

In the case where the charging device 200 is a second type device, in step 625, the charging circuit 150 may set the setting time of the charging limit timer 151 to an eighth time. For example, in the case where the number of charging cycles of the battery 140 is greater than or equal to 500 times and the charging device 200 is a device supplying the charging power of a second magnitude greater than the specified first magnitude, the charging circuit 150 may set the setting time of the charging limit timer 151 to 4 hours. In this operation, the charging circuit 150 may set the setting time of the charging limit timer 151 to a time that is less than 4 hours or is greater than 4 hours, depending on the amount of charge upon charging.

In the case where the charging device 200 is a third type device, in step 627, the charging circuit 150 may set the setting time of the charging limit timer 151 to a ninth time. For example, in the case where the number of charging cycles of the battery 140 is greater than or equal to 500 times and the charging device 200 is a device supplying the charging power of a third magnitude greater than the second magnitude, the charging circuit 150 may set the setting time of the charging limit timer 151 to 2 hours. In this operation, the charging circuit 150 may set the setting time of the charging limit timer 151 to a time that is less than 2 hours or is greater than 2 hours, depending on the amount of charge upon charging.

As described above, it is generally taught that the setting time of the charging limit timer 151 is set to be gradually short depending on the increase in the number of charging cycles, in a state where the same charging power is supplied depending on the increase in the number of charging cycles. In the case where the charging power gradually decreases as the number of charging cycles increases, the charging time may be the same as the previous setting time or may increases, even though the number of charging cycles increases. In this case, in a state where the number of charging cycles is less than the first frequency, the charging circuit 150 may set the setting time of the charging limit timer 151 to 10 hours if the charging device 200 is the first type device, the charging circuit 150 may set the setting time of the charging limit timer 151 to 5 hours if the charging device 200 is the second type device, and the charging circuit 150 may set the setting time of the charging limit timer 151 to 3 hours if the charging device 200 is the third type device. In the case where the charging current is adjusted depending on the increase in the number of charging cycles, the charging circuit 150 may set the setting time of the charging limit timer 151 to 10 hours and 30 minutes if the charging device 200 is the first type device in a state where the number of charging cycles is greater than or equal to the first frequency and is less than the second frequency, the charging circuit 150 may set the setting time of the charging limit timer 151 to 5 hours and 30 minutes if the charging device 200 is the second device in a state where the number of charging cycles is greater than or equal to the first frequency and is less than the second frequency, and the charging circuit 150 may set the setting time of the charging limit timer 151 to 3 hours and 30 minutes if the charging device 200 is the third type device in a state where the number of charging cycles is greater than or equal to the first frequency and is less than the second frequency. In the case where the charging current is adjusted depending on the increase in the number of charging cycles, the charging circuit 150 may set the setting time of the charging limit timer 151 to 11 hours if the charging device 200 is the first type device in a state where the number of charging cycles is greater than or equal to the second frequency, the charging circuit 150 may set the setting time of the charging limit timer 151 to 6 hours if the charging device 200 is the second type device in a state where the number of charging cycles is greater than or equal to the second frequency, and the charging circuit 150 may set the setting time of the charging limit timer 151 to 4 hours if the charging device 200 is the third type device in a state where the number of charging cycles is greater than or equal to the second frequency.

Figure 7:
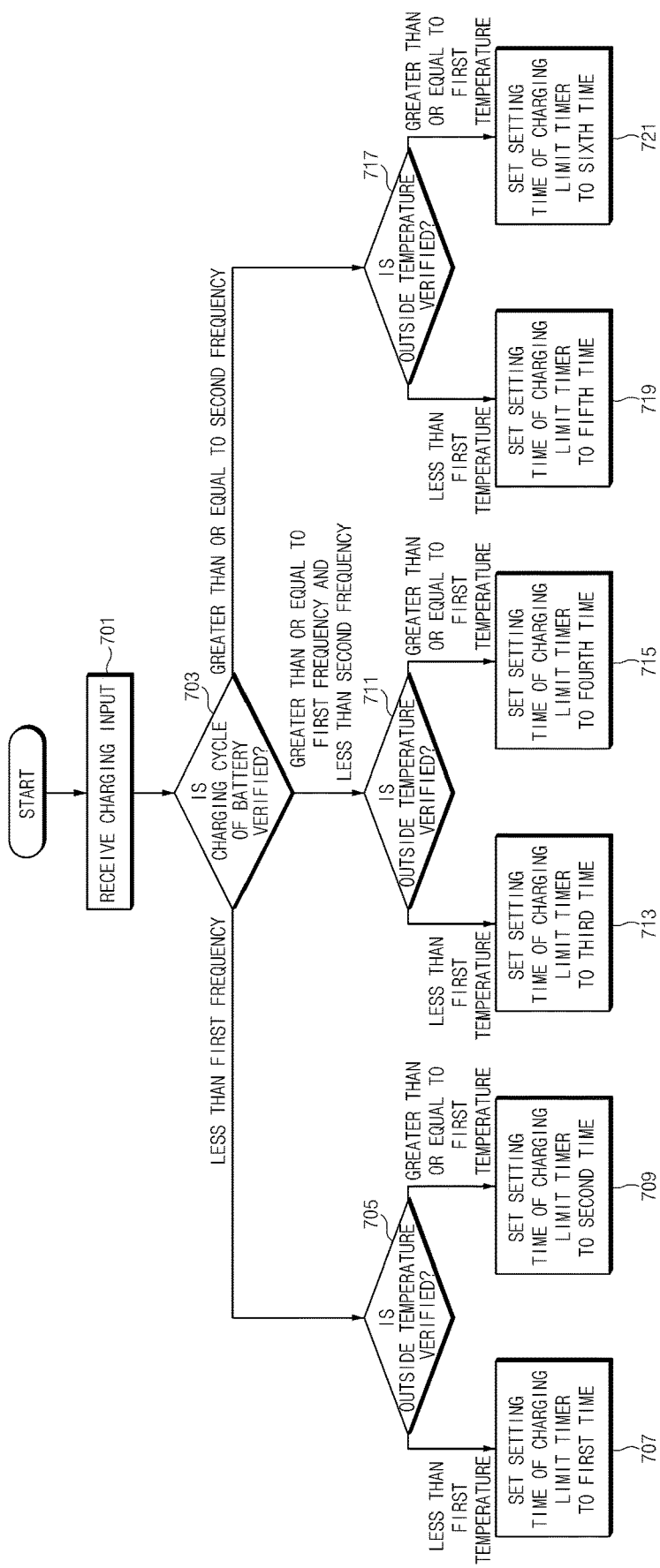
FIG. 7 is a flowchart illustrating a battery charging method associated with a charging cycle according to an embodiment of the present disclosure.

FIG. 7 is a flowchart illustrating a battery charging method associated with a charging cycle according to an embodiment of the present disclosure.

Referring to FIG. 7, with regard to the battery charging method, in step 701, the charging circuit 150 may receive a charging-related input.

In step 703, the charging circuit 150 may verify the charging cycle of the battery 140. With regard to the verification of the charging cycle of the battery 140, as described above, the charging circuit 150 may accumulate, store, and manage a charge-discharge count by using a coulomb counter. Alternatively, after a separate sub-memory associated with the battery 140 is provided and the charging cycle of the battery 140 is recorded in the corresponding sub-memory, the charging cycle of the battery 140 may be verified through the information recorded in the sub-memory. According to an embodiment of the present disclosure, a circuit (e.g., a protection circuit) disposed in the battery 140 may store information about the charging cycle and may provide the information about the charging cycle to the charging circuit 150 in response to the request of the charging circuit 150.

In the case where the number of charging cycles of the battery 140 is less than a first frequency, in step 705, the charging circuit 150 may verify an outside temperature. For example, in the case where the number of charging cycles of the battery 140 is less than 300 times, the charging circuit 150 may verify the outside temperature. In this operation, the charging circuit 150 may collect temperature information, which is obtained by a temperature sensor located in the battery 140 within a specified distance from the battery 140, as the outside temperature of the battery 140. Alternatively, the charging circuit 150 may be disposed in one side of the housing of the electronic device 100 and may collect the temperature of a display or another element (e.g., a CPU, a camera, a CP, or the like) as the outside temperature. Alternatively, the charging circuit 150 may perform near distance communication or wired communication with the electronic device 100 such as the charging device 200 or the like and may receive temperature information from any other external electronic device including a temperature sensor. Alternatively, the charging circuit 150 may receive a temperature of a point at which the electronic device 100 is located from a temperature providing server. The temperature providing server may include a server collecting and managing the temperature information from a temperature sensor disposed at each specified location.

In the case where the outside temperature is less than a first temperature (e.g., less than 45 degrees Celsius, a room temperature, or the like), in step 707, the charging circuit 150 may set the setting time of the charging limit timer 151 of the battery 140 to a first time. For example, in the case where the number of charging cycles is less than 300 times and the outside temperature is less than 45 degrees Celsius, the charging circuit 150 may set the setting time of the charging limit timer 151 to 5 hours.

In the case where the temperature is greater than or equal to a specified magnitude, the charging time may be lengthened in response to a charging current control operation. To cope with this situation, in the case where the outside temperature is greater than or equal to the first temperature (e.g., more than 45 degrees Celsius, a room temperature, or the like), in step 709, the charging circuit 150 may set the setting time of the charging limit timer 151 of the battery 140 to a second time. For example, in the case where the number of charging cycles is less than 300 times and the outside temperature is greater than or equal to 45 degrees Celsius, the charging circuit 150 may set the setting time of the charging limit timer 151 to 7 hours.

In the case where the number of charging cycles of the battery 140 is greater than or equal to the first frequency and is less than a second frequency, in step 711, the charging circuit 150 may verify the outside temperature. The outside temperature information may be collected depending on at least one of the above-described methods. In the case where the outside temperature is less than the first temperature, in step 713, the charging circuit 150 may set the setting time of the charging limit timer 151 to a third time. As the number of charging cycles increases, the maximum charging capacity of a battery may decrease. Accordingly, in the case where the magnitude of charging power or a charging current is the same, a battery charging time may decrease. As such, for example, in the case where the number of charging cycles of the battery 140 is greater than or equal to 301 times and is less than 500 times and the outside temperature is less than 45 degrees Celsius, the charging circuit 150 may set the setting time of the charging limit timer 151 to 5 hours and 30 minutes.

In the case where the outside temperature is greater than or equal to the first temperature, in step 715, the charging circuit 150 may set the setting time of the charging limit timer 151 to a fourth time. For example, in the case where the number of charging cycles of the battery 140 is greater than or equal to 301 times and is less than 500 times and the outside temperature is greater than or equal to 45 degrees Celsius, the charging circuit 150 may set the setting time of the charging limit timer 151 to 7 hours and 30 minutes.

In the case where the number of charging cycles of the battery 140 is greater than or equal to the second frequency, in step 717, the charging circuit 150 may verify the outside temperature. The outside temperature information may be collected based on at least one of the above-described methods. In the case where the outside temperature is less than the first temperature, in step 719, the charging circuit 150 may set the setting time of the charging limit timer 151 to a fifth time. For example, in the case where the number of charging cycles of the battery 140 is greater than or equal to 500 times and the outside temperature is less than 45 degrees, the charging circuit 150 may set the setting time of the charging limit timer 151 to 6 hours.

In the case where the outside temperature is greater than or equal to the first temperature, in step 721, the charging circuit 150 may set the setting time of the charging limit timer 151 to a sixth time. For example, in the case where the number of charging cycles of the battery 140 is greater than or equal to 500 times and the outside temperature is greater than or equal to 45 degrees, the charging circuit 150 may set the setting time of the charging limit timer 151 to 8 hours.

Additionally or selectively, with regard to the change in the setting time of the charging limit timer 151 according to battery charging situation information, the charging circuit 150 may set the setting time to the charging limit timer 151 depending on at least one of the charging cycle, the outside temperature upon charging, and SOC.

As described above, in the charging circuit 150 according to an embodiment of the present disclosure, as the number of charging cycles increases, the maximum charging capacity of a battery may decrease. The battery charging time may decrease in a state where the same charging power is supplied. As such, the setting time of the charging limit timer 151 may be set to be a short time depending on the increase in the number of charging cycles. In addition, as the outside temperature increases, a charging current control operation may be applied. In this case, in correspondence to the case where the battery charging time is lengthened, the charging circuit 150 may set the setting time of the charging limit timer 151 of the battery 140 to be a long time when the outside temperature increases.

According to various embodiments of the present disclosure, in the case where the electronic device 100 supports a function configured to reduce the magnitude of the charging current as the number of charging cycles increases, the charging time may be the same or may be situationally lengthened, even though the number of charging cycles increases. In the case where the function is applied, regardless of the increase in the number of charging cycles, the electronic device 100 may perform only the verification of the outside temperature to adjust the setting time of the charging limit timer 151 or may increase the setting time of the charging limit timer 151 when the number of charging cycles increases. Accordingly, the electronic device 100 may additionally change the setting time depending on the outside temperature.

Figure 8:
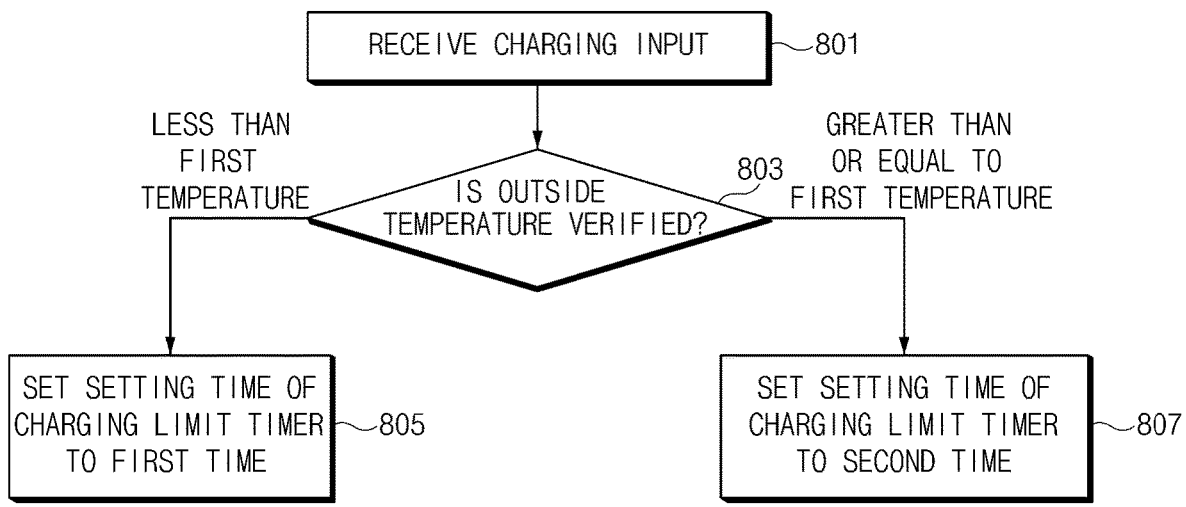
FIG. 8 is a flowchart illustrating a battery charging method associated with an outside temperature according to an embodiment of the present disclosure.

FIG. 8 is a flowchart illustrating a battery charging method associated with an outside temperature according to an embodiment of the present disclosure.

Referring to FIG. 8, with regard to the battery charging method, in step 801, the charging circuit 150 may receive a charging-related input.

If the charging-related input is received, in step 803, the charging circuit 150 may verify the outside temperature of the electronic device 100 or the outside temperature of the battery 140. For example, the electronic device 100 may include at least one temperature sensor capable of measuring the outside temperature and may verify the outside temperature based on sensor information that the temperature sensor provides. According to various embodiments of the present disclosure, the electronic device 100 may collect temperature information corresponding to the current location from a server providing the temperature information. Alternatively, in the case where the charging device 200 includes the temperature sensor, the electronic device 100 may receive outside temperature information from the connected charging device 200. In this case, the electronic device 100 may collect the temperature information (e.g., temperature information of a location at which the charging device 200 is disposed) of a location, which is spaced apart from a device by a specific distance, as the outside temperature. Alternatively, for example, the electronic device 100 may collect the temperature of a specific internal location of the electronic device 100, which is spaced apart from the battery 140 by a specific distance, as the outside temperature. Alternatively, the electronic device 100 may collect the surface temperature of the housing 103 of the electronic device 100 as the outside temperature.

In the case where the outside temperature is less than a first temperature, in step 805, the charging circuit 150 may set the setting time of the charging limit timer 151 to a first time. For example, in the case where the outside temperature is less than 45 degrees Celsius, the charging circuit 150 may set the setting time of the charging limit timer 151 to 5 hours. In this operation, the setting time of the charging limit timer 151 may be changed (e.g., further decrease or further increase) depending on at least one of the amount of charge of the battery 140 upon charging and the charging cycle of the battery 140.

In the case where the outside temperature is greater than or equal to the first temperature, in step 807, the charging circuit 150 may set the setting time of the charging limit timer 151 to a second time. For example, in the case where the outside temperature is greater than or equal to 45 degrees Celsius, the charging circuit 150 may set the setting time of the charging limit timer 151 to 7 hours. In this operation, the setting time of the charging limit timer 151 may be changed (e.g., further decrease or further increase) depending on at least one of the amount of charge of the battery 140 upon charging and the charging cycle of the battery 140.

In the case where the outside temperature is less than a specified temperature, and in the case where a temperature according to the physiochemical characteristic of the battery 140 is lower than a specified temperature, battery impedance may increase. Accordingly, the charging time of the battery 140 may be lengthened under the charging condition the same as the previous charging condition. As such, as described above, the setting time of the charging limit timer 151 may be changed depending on the outside temperature.

Accordingly, the electronic device 100 according to an embodiment of the present disclosure may secure sufficient time to fully charge the battery 140.

The above-described details are described based on the outside temperature of the electronic device 100 or the outside temperature of the battery 140. The electronic device 100 according to an embodiment of the present disclosure may adjust the setting time of the charging limit timer 151 based on the inside temperature of the electronic device 100, the temperature of the battery 140, or the like.

Figure 9:
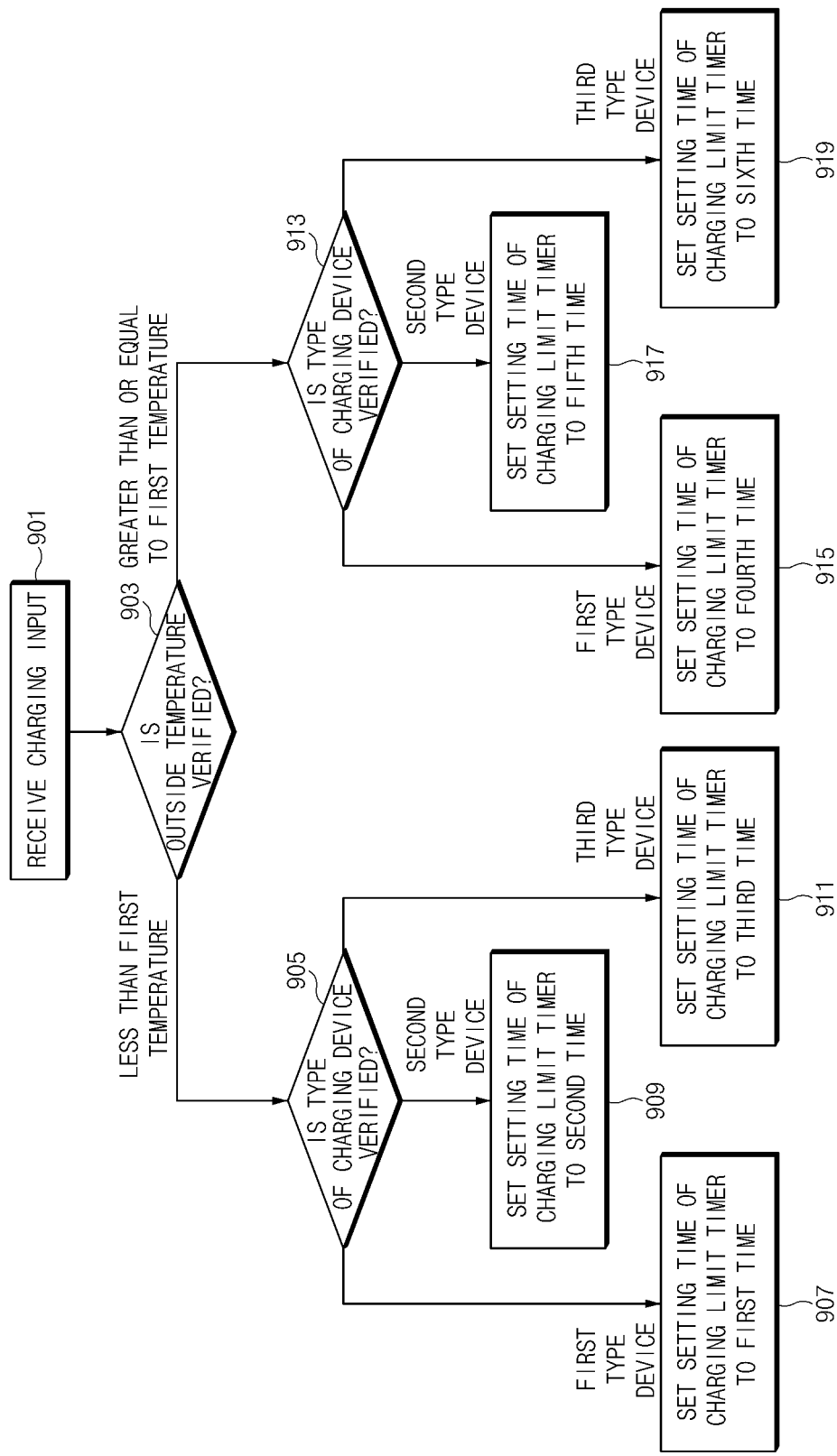
FIG. 9 is a flowchart illustrating a battery charging method associated with an outside temperature according to an embodiment of the present disclosure.

FIG. 9 is a flowchart illustrating a battery charging method associated with an outside temperature according to an embodiment of the present disclosure.

Referring to FIG. 9, with regard to the battery charging method, in step 901, the charging circuit 150 may receive a charging-related input. In step 903, the charging circuit 150 may verify the outside temperature of the battery 140 or the outside temperature of the electronic device 100. As described above, the outside temperature may be verified based on temperature information collected from at least one temperature sensor disposed in the electronic device 100 or may be verified based on the temperature information received from an external electronic device (e.g., the charging device 200 or a server). In this regard, as described in FIG. 8, the electronic device 100 may collect the outside temperature from temperature sensors disposed in the electronic device 100, the charging device 200, or the like.

In the case where the outside temperature is less than a first temperature, in step 905, the charging circuit 150 may verify a type of the charging device 200. The charging circuit 150 may determine the type of the charging device 200. In the case where the charging device 200 is a first type device, in step 907, the charging circuit 150 may set the setting time of the charging limit timer 151 to a first time. For example, in the case where the outside temperature is less than 45 degrees Celsius and the charging device 200 is a device supplying first charging power (e.g., 2.5 W (5 V*0.5 A)), the charging circuit 150 may set the setting time of the charging limit timer 151 to 10 hours. In this operation, the charging circuit 150 may change (e.g., change from 10 hours to 11 hours or change to 9 hours) the setting time of the charging limit timer 151 based on at least one of the amount of charge of the battery 140 and the charging cycle of the battery 140.

In the case where the charging device 200 is a second type device, in step 909, the charging circuit 150 may set the setting time of the charging limit timer 151 to a second time. For example, in the case where the outside temperature is less than 45 degrees Celsius and the charging device 200 is a TA device capable of supplying second charging power (e.g., 4.5 W (5 V*0.9 A) to 10 W (5 V*2 A)), the charging circuit 150 may set the setting time of the charging limit timer 151 to 5 hours. In this operation, the charging circuit 150 may change the setting time of the charging limit timer 151 to a time different from 5 hours based on at least one of the amount of charge of the battery 140 and the charging cycle of the battery 140. For example, in the case where the number of charging cycles is less than a specified reference value and the amount of charge is greater than or equal to 50%, the charging circuit 150 may change the setting time of the charging limit timer 151 to 3 hours. Alternatively, in the case where the number of charging cycles is greater than or equal to a specified reference value and the amount of charge is less than 10%, the charging circuit 150 may change the setting time of the charging limit timer 151 to 7 hours.

In the case where the charging device 200 is a third type device, in step 911, the charging circuit 150 may set the setting time of the charging limit timer 151 to a third time. For example, in the case where the outside temperature is less than 45 degrees and the charging device 200 is a device (e.g., a fast charging device) supplying third charging power (e.g., 15 W (9 V*1.67 A)), the charging circuit 150 may set the setting time of the charging limit timer 151 to 3 hours. In this operation, the charging circuit 150 may set the setting time of the charging limit timer 151 to a time different from 3 hours based on at least one of the amount of charge of the battery 140 and the charging cycle of the battery 140.

In the case where the outside temperature is greater than or equal to a first temperature, in step 913, the charging circuit 150 may verify a type of the charging device 200. The charging circuit 150 may determine the type of the charging device 200. In the case where the charging device 200 is the first type device, in step 915, the charging circuit 150 may set the setting time of the charging limit timer 151 to a fourth time. For example, in the case where the outside temperature is greater than or equal to 45 degrees Celsius and the charging device 200 is a device capable of supplying first charging power (e.g., 2.5 W (5 V*0.5 A)), the charging circuit 150 may set the setting time of the charging limit timer 151 to 10 hours and 30 minutes. In this operation, the charging circuit 150 may additionally adjust the setting time of the charging limit timer 151 based on at least one of the amount of charge of the battery 140 and the charging cycle of the battery 140.

In the case where the charging device 200 is the second type device, in step 917, the charging circuit 150 may set the setting time of the charging limit timer 151 to a fifth time. For example, in the case where the outside temperature is greater than or equal to 45 degrees Celsius and the charging device 200 is a device capable of supplying second charging power (e.g., 4.5 W (5 V*0.9 A) to 10 W (5 V*2 A)), the charging circuit 150 may set the setting time of the charging limit timer 151 to 5 hours and 30 minutes. In this operation, the charging circuit 150 may additionally adjust the setting time of the charging limit timer 151 based on at least one of the amount of charge of the battery 140 and the charging cycle of the battery 140.

In the case where the charging device 200 is the third type device, in step 919, the charging circuit 150 may set the setting time of the charging limit timer 151 to a sixth time. For example, in the case where the outside temperature is greater than or equal to 45 degrees Celsius and the charging device 200 is a device capable of supplying third charging power (e.g., 15 W (9 V*1.67 A)), the charging circuit 150 may set the setting time of the charging limit timer 151 to 3 hours and 30 minutes. In this operation, the charging circuit 150 may additionally adjust the setting time of the charging limit timer 151 based on at least one of the amount of charge of the battery 140 and the charging cycle of the battery 140.

Figure 10:
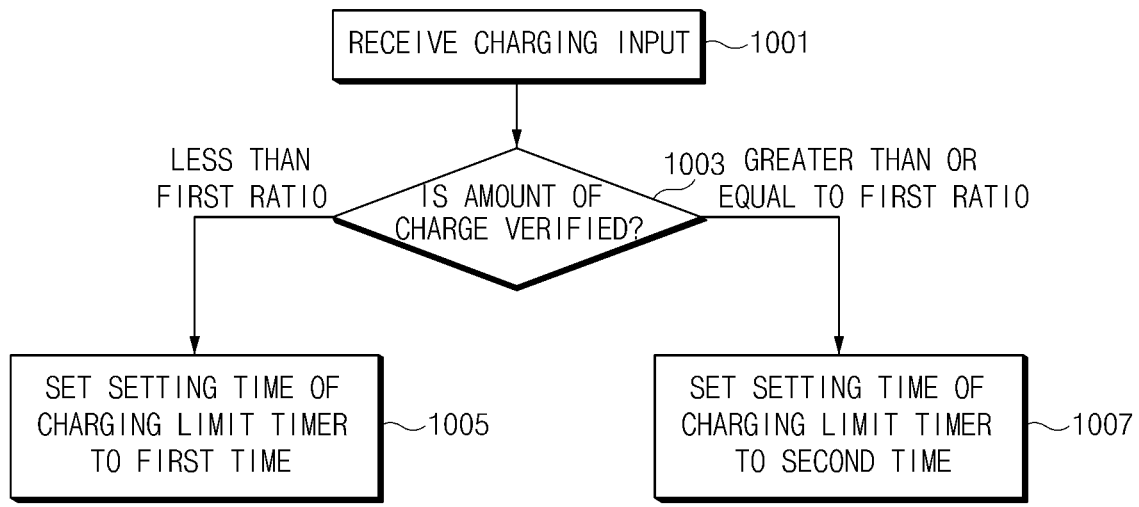
FIG. 10 is a flowchart illustrating a battery charging method associated with an amount of charge according to an embodiment of the present disclosure.

FIG. 10 is a flowchart illustrating a battery charging method associated with an amount of charge according to an embodiment of the present disclosure.

Referring to FIG. 10, with regard to the battery charging method, in step 1001, the charging circuit 150 may receive a charging-related input. In step 1003, the charging circuit 150 may verify the SOC (e.g., an amount of charge) of the battery 140. In this regard, the charging circuit 150 may detect the charging voltage of the battery 140 or the like, and may verify the amount of charge based on the detected charging voltage.

In the case where the SOC is less than a first ratio, in step 1005, the charging circuit 150 may set the setting time of the charging limit timer 151 to a first time. For example, in the case where the SOC is less than 50%, the charging circuit

150 may set the setting time of the charging limit timer 151 to 10 hours. In this operation, the charging circuit 150 may additionally adjust the setting time of the charging limit timer 151 based on at least one of the charging cycle of the battery 140 or the outside temperature.

In the case where the SOC is greater than or equal to the first ratio, in step 1007, the charging circuit 150 may set the setting time of the charging limit timer 151 to a second time. For example, in the case where the SOC is greater than or equal to 50%, the charging circuit 150 may set the setting time of the charging limit timer 151 to 5 hours. In this operation, the charging circuit 150 may additionally adjust the setting time of the charging limit timer 151 based on at least one of the charging cycle of the battery 140 or the outside temperature.

Figure 11:
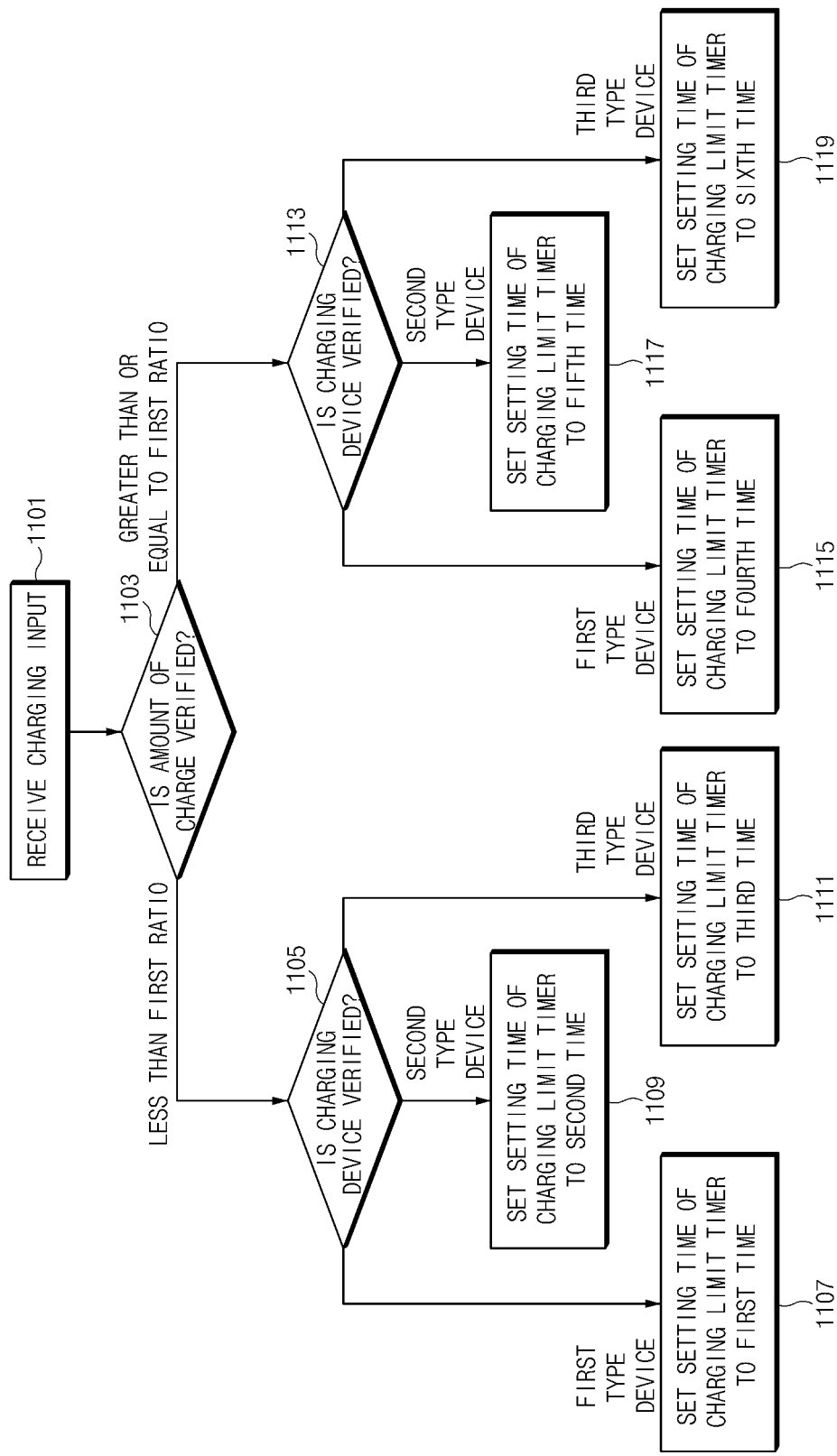
FIG. 11 is a flowchart illustrating a battery charging method associated with an amount of charge according to an embodiment of the present disclosure.

FIG. 11 is a flowchart illustrating a battery charging method associated with an amount of charge according to an embodiment of the present disclosure.

Referring to FIG. 11, with regard to the battery charging method, in step 1101, the charging circuit 150 may receive a charging-related input. In step 1103, the charging circuit 150 may verify the SOC (e.g., an amount of charge) of the battery 140. The charging circuit 150 may determine the amount of charge.

In the case where the amount of charge of the battery 140 is less than a first ratio, in step 1105, the charging circuit 150 may verify a type of the charging device 200. The charging circuit 150 may determine the type of the charging device 200. In the case where the charging device 200 is a first type device, in step 1107, the charging circuit 150 may set the setting time of the charging limit timer 151 to a first time. For example, in the case where the amount of charge is less than 50%, and in the case where the charging device 200 supplies charging power of a specified first magnitude through the USB connection of an external electronic device, the charging circuit 150 may set the setting time of the charging limit timer 151 to 10 hours.

In the case where the charging device 200 is a second type device, in step 1109, the charging circuit 150 may set the setting time of the charging limit timer 151 to a second time. For example, in the case where the amount of charge is less than 50%, and in the case where the charging device 200 supplies the charging power of a second magnitude greater than the specified first magnitude, the charging circuit 150 may set the setting time of the charging limit timer 151 to 5 hours.

In the case where the charging device 200 is a third type device, in step 1111, the charging circuit 150 may set the setting time of the charging limit timer 151 to a third time. For example, in the case where the amount of charge is less than 50%, and in the case where the charging device 200 supplies the charging power of a third magnitude greater than the second magnitude, the charging circuit 150 may set the setting time of the charging limit timer 151 to 3 hours.

In the case where the amount of charge of the battery 140 is greater than or equal to the first ratio, in step 1113, the charging circuit 150 may verify the type of the charging device 200. The charging circuit 150 may determine the type of the charging device 200. In the case where the charging device 200 is the first type device, in step 1115, the charging circuit 150 may set the setting time of the charging limit timer 151 to a fourth time. For example, in the case where the amount of charge is greater than or equal to 50%, and in the case where the charging device 200 supplies the charging power of the specified first magnitude, the charging circuit 150 may set the setting time of the charging limit timer 151 to 8 hours.

In the case where the charging device 200 is the second type device, in step 1117, the charging circuit 150 may set the setting time of the charging limit timer 151 to a fifth time. For example, in the case where the amount of charge is greater than or equal to 50%, and in the case where the charging device 200 supplies the charging power of the second magnitude greater than the first magnitude, the charging circuit 150 may set the setting time of the charging limit timer 151 to 4 hours.

In the case where the charging device 200 is the third type device, in step 1119, the charging circuit 150 may set the setting time of the charging limit timer 151 to a sixth time. For example, in the case where the amount of charge is greater than or equal to 50%, and in the case where the charging device 200 supplies the charging power of the third magnitude greater than the second magnitude, the charging circuit 150 may set the setting time of the charging limit timer 151 to 2 hours.

In the above-mentioned operation, the charging circuit 150 may additionally change the setting time of the charging limit timer 151, which is set depending on the amount of charge and the type of the charging device 200, depending on at least one of the number of charging cycles of the battery 140, the outside temperature, or the number of days elapsed from the manufacturing date of the battery 140.

According to various embodiments of the present disclosure, in the case where the charging is interrupted by the operation of the charging limit timer 151, which occurs more than a specified frequency within a specified time, the charging circuit 150 may output an alarm message (e.g., output audio or video information indicating a charging interrupt state). Alternatively, in the case where the charging is interrupted by the charging limit timer 151, the operation of which occurs more than a specified frequency within a specified time, the charging circuit 150 may adjust the setting time of the charging limit timer 151. For example, in the case where the reset of the charging limit timer 151 occurs more than 3 times within 1 hour, the charging circuit 150 may set the setting time of the charging limit timer 151 to 2 hours.

As described above, the processor 110 or the charging circuit 150 of an electronic device according to an embodiment of the present disclosure may adjust the setting time of the charging limit timer 151 associated with the charging of the battery 140 based on the combination of at least one or more factors (e.g., a type of the charging device 200, an ambient temperature (e.g., the outside temperature or inside temperature of the electronic device 100) associated with the battery charging situation, the number of charging cycles of a battery, an amount of charge of the battery, and the number of days elapsed from the manufacturing date of the battery) associated with battery charging. For example, the processor 110 may determine the setting time of the charging limit timer 151 in a complex manner depending on whether the ambient temperature is greater than or equal to a specified first temperature, whether the number of charging cycles of the battery is less than a specified first frequency, whether the amount of charge of the battery is greater than or equal to a specified first ratio, or the like.

For example, if a first condition that the ambient temperature is greater than or equal to the first temperature, the number of charging cycles of the battery is less than the first frequency, the amount of charge of the battery is greater than or equal to the first ratio, and the type of the charging device is a fast charging device (e.g., a charging device capable of supplying charging power of 15 W (9 V*1.67 A)) is satisfied, the processor 110 may set the setting time of the charging limit timer 151 to 2 hours. Alternatively, if in the first condition, the ambient temperature is less than the first temperature, the number of charging cycles of the battery is greater than or equal to the first frequency, the amount of charge of the battery is less than the first ratio, or the charging device is a charging device of normal speed (e.g., a charging device capable of supplying charging power of a range from 4.5 W(5 V*0.9 A) to 10 W (5 V*2 A)), the processor 110 may set the setting time of the charging limit timer 151 to 4 hours.

According to various embodiments of the present disclosure, if a second condition that the ambient temperature is less than the first temperature, the number of charging cycles of the battery is greater than or equal to the first frequency, the amount of charge of the battery at the start of charging is less than the first ratio, and the type of the charging device is the fast charging device (e.g., a charging device capable of supplying charging power of a range from 15 W (9 V*1.67 A) to 20 W (10 V*2 A)) is satisfied, the processor 110 may set the setting time of the charging limit timer 151 to 2 hours and 30 minutes. Alternatively, if in the second condition, the amount of charge of the battery is greater than or equal to the first ratio, or the type of the charging device is a charging device of normal speed (e.g., a charging device capable of supplying charging power of a range from 4.5 W (5 V*0.9 A) to 10 W (5 V*2 A)), the processor 110 may set the setting time of the charging limit timer 151 to 4 hours.

According to various embodiments of the present disclosure, the processor 110 may change the setting time of the charging limit timer 151 in a cyclic interval with a period or in real time based on the change in the ambient temperature. For example, in a first temperature environment at the start of charging, after the setting time of the charging limit timer 151 is set to a first time, the ambient temperature may change. In this case, if the temperature environment is changed to a second temperature environment (e.g., a temperature environment higher than the first temperature environment), the processor 110 may change the setting time of the charging limit timer 151 to a second time (e.g., a time shorter than the first time).

According to various embodiments of the present disclosure, if the charging device 200 is disconnected and a new charging device is connected, the processor 110 may reset the charging limit timer 151 and may determine the setting time of the charging limit timer 151 based on a type of a charging device, which is newly connected, and a charging environment.

According to various embodiments of the present disclosure, a battery charging control method of an electronic device that includes a battery supplying power, a charging circuit charging the battery, and a processor is provided. The method may include obtaining context information associated with charging of the battery by using the processor, if the context information satisfies a first specified condition, allowing a timer associated with a charging time of the charging circuit to a first time, if the context information satisfies a second specified condition, allowing the timer to a second time different from the first time, and charging the battery by using the charging circuit during the first time corresponding to the first specified condition or the second time corresponding to the second specified condition.

According to various embodiments of the present disclosure, obtaining the context information may include obtaining the context information in response to an occurrence of a specified event.

According to various embodiments of the present disclosure, obtaining the context information may include sensing connection between the electronic device and an external power device as at least part of the specified event.

According to various embodiments of the present disclosure, obtaining the context information may include sensing a user input to the electronic device as at least part of the specified event.

According to various embodiments of the present disclosure, obtaining the context information may include obtaining information of a type of an external power device connected to the electronic device as at least partial information of the context information.

According to various embodiments of the present disclosure, obtaining the context information may include obtaining information of a power capacity capable of being supplied through an external power device connected to the electronic device as at least partial information of the context information.

According to various embodiments of the present disclosure, obtaining the context information may include obtaining information of a charging frequency of the battery, a charging speed of the battery, a state of charge of the battery, or an inside temperature or an outside temperature of the electronic device as at least partial information of the context information.

According to various embodiments of the present disclosure, the method may further include providing notification information corresponding to an operation of limiting the charging of the electronic device.

According to various embodiments of the present disclosure, a battery charging method of an electronic device according to an embodiment may include receiving an input associated with the charging of a battery, collecting at least one factor associated with the battery charging environment, and setting a setting time of a charging limit timer limiting the battery charging depending on the at least one factor.

According to various embodiments of the present disclosure, collecting the at least one factor may include collecting at least one of information about a type of a charging device or a charging current magnitude of the charging device, which is associated with the battery charging, ambient temperature information associated with the battery charging, the number of charge-discharge cycles of the battery, the amount of charge of the battery, information about the number of days elapsed from the battery manufacturing date, or impedance of the battery.

According to various embodiments of the present disclosure, differently setting the setting time of the charging limit timer may include setting the setting time of the charging limit timer to be short as the magnitude of a charging current of the charging device increases.

According to various embodiments of the present disclosure, differently setting the setting time of the charging limit timer may include setting the setting time of the charging limit timer to be short as the frequency of the battery charging cycle increases in an environment in which the same charging power is supplied.

According to various embodiments of the present disclosure, differently setting the setting time of the charging limit timer may include, in the case where a function to adjust the charging current is applied as the number of charging cycles increases, setting the setting time of the charging limit timer to be the same or to be long as the number of charging cycles of the battery increases.

According to various embodiments of the present disclosure, differently setting the setting time of the charging limit timer may include setting the setting time of the charging limit timer to be long in preparation for the increase in a battery charging time because a charging current control operation is applied as the ambient temperature increases.

According to various embodiments of the present disclosure, differently setting the setting time of the charging limit timer may include setting the setting time of the charging limit timer to be short, in correspondence to the decrease in a charging time as the impedance of a battery decreases because the ambient temperature increases.

According to various embodiments of the present disclosure, differently setting the setting time of the charging limit timer may include setting the setting time of the charging limit timer to be short as the ratio of the amount of charge of the battery increases.

According to various embodiments of the present disclosure, differently setting the setting time of the charging limit timer may include setting the setting time of the charging limit timer to be short as the number of days elapsed from the manufacturing date of the battery is shortened.

According to various embodiments of the present disclosure, the method may further include, if the charging device is disconnected and then the charging device is newly connected, resetting the setting time of the charging limit timer depending on at least one factor associated with the battery charging environment in a state where the charging device is connected.

According to various embodiments of the present disclosure, the method may further include, if the number of times that the resetting of the setting time of the charging limit timer occurs is greater than or equal to a specified frequency within a specified time, interrupting the charging operation during a specified time and guiding the occurrence of a charging error.

According to various embodiments of the present disclosure, the method may further include, if the charging limit timer ends, interrupting the charging operation of the battery, and if the charging device is disconnected and then is newly connected, charging the battery while the setting time of the charging limit timer is set again.

Figure 12:
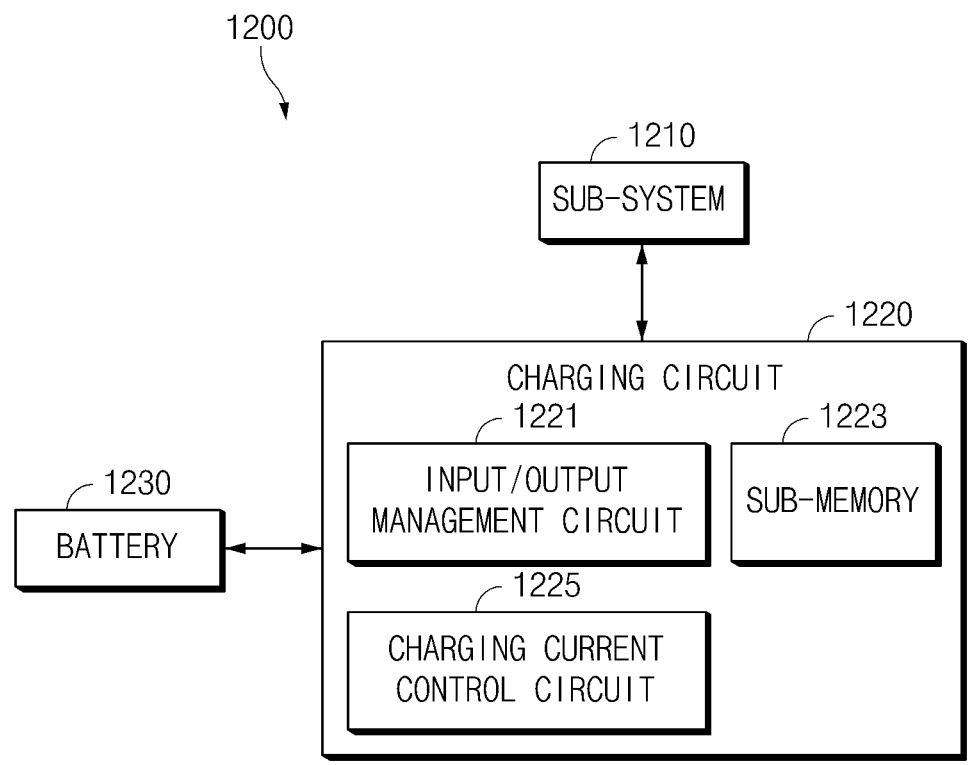
FIG. 12 is a block diagram illustrating a configuration of an electronic device according to an embodiment of the present disclosure.

FIG. 12 is a block diagram illustrating a configuration of an electronic device according to an embodiment of the present disclosure.

Referring to FIG. 12, an electronic device 1200 may include a battery 1230, a charging circuit 1220, and a sub-system 1210.

The battery 1230 may be seated inside the electronic device 1200 and may supply power. The battery 1230 may be embedded in the electronic device 1200, detachable from the electronic device 1200, and the like. The battery 1230 may be charged by using power from a charging device under control of the charging circuit 1220. The battery 1230 may be a rechargeable battery or battery system including one or more battery cells. The battery cell may be a rechargeable chemical battery, such as lithium ion, lithium polymer, nickel-manganese, or the like. However, the kind of the battery cell is not limited in the present disclosure.

The sub-system 1210 may include a configuration associated with various user functions operated by using power that the battery 1230 provides. For example, the sub-system 1210 may include an application processor, a camera, an audio device, an input/output device, a display, at least one sensor, a CP, a memory, or the like.

The charging circuit 1220 may include an input/output management circuit 1221, a charging current control circuit 1225, and a sub-memory 1223.

The input/output management circuit 1221 may communicate with the battery 1230 and the sub-system 1210. For example, the input/output management circuit 1221 may set or measure a current or a voltage, which is provided to the battery 1230 or which the battery 1230 provides.

The sub-memory 1223 may store charging cycle information of the battery 1230. In this regard, the sub-memory 1223 may include a register capable of recording the charging cycle information. The sub-memory 1223 may store information about how much the battery 1230 is degraded.

The charging current control circuit 1225 may count the charging or discharging cycles of the battery 1230. The charging current control circuit 1225 may monitor how much the battery 1230 is degraded. For example, the charging current control circuit 1225 may predict the remaining life of the battery 1230. The charging current control circuit 1225 may change the charging current of the battery 1230. In this regard, the charging current control circuit 1225 may include a communication circuit that communicates with a charging device and may make a request for a charging current value to the charging device.

According to various embodiments of the present disclosure, the charging current control circuit 1225 may adjust the charging current such that the charging speed of the battery 1230 is not changed regardless of how much the battery 1230 is degraded. For example, in the case where the battery 1230 has a capacity of 3 Ah based on 4 V, the charging current control circuit 1225 may make a request for the power supply according to a specified current (e.g., 3 A based on 4 V) to the charging device capable of charging the battery 1230 within a specified time (e.g., 1 hour). Even though a maximum charging capacity is reduced as the increase in a charge-discharge frequency of the battery 1230 or the decrease in the maximum charging capacity according to the number of days elapsed from the manufacturing date of the battery 1230, the charging current control circuit 1225 may allow the battery 1230 to be charged during a specified time. For example, in the case where the battery 1230 has the charging capacity of 3 Ah is changed to the battery 1230 having the charging capacity of 2.7 Ah, the charging current control circuit 1225 may make a request for the charging power of 2.7 A to the charging device when the battery 1230 is charged. As described above, even though the maximum charging capacity is reduced, the charging circuit 1220 according to an embodiment of the present disclosure may maintain the charging time to be the same, thereby reducing the charging stress of the battery 1230 which may increase the life of the battery 1230.

Figure 13:
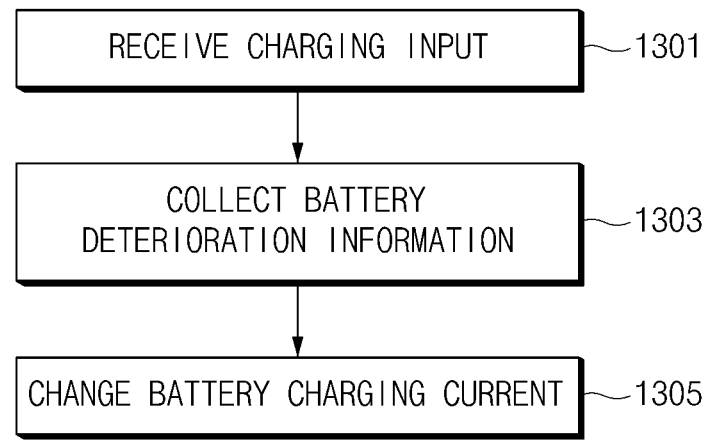
FIG. 13 is a flowchart illustrating a battery charging method associated with a change in a battery charging current according to an embodiment of the present disclosure.

FIG. 13 is a flowchart illustrating a battery charging method associated with a change in a battery charging current according to an embodiment of the present disclosure.

Referring to FIG. 13, with regard to the battery charging method, in step 1301, the charging circuit 1220, or the charging circuit 150 or an embedded processor such as a processor of the electronic device 1200, a controller, a PMIC, or the like, may receive a charging input. For example, if a charging device is connected to a charging interface, the charging circuit 1220 may detect a signal according to the connection of the charging device, may receive a signal that the charging device 200 provides, or may receive a feedback signal of a signal transmitted to the charging device 200 as the charging input.

In step 1303, the charging circuit 1220 may collect battery deterioration information. In this operation, the charging circuit 1220 may monitor the deterioration of an electronic device to predict the remaining life. According to various embodiments of the present disclosure, the charging circuit 1220 may monitor the number of charging and/or discharging cycles of the battery 1230, the number of hours elapsed after the manufacturing date of the battery 1230, the change in an internal resistance value of the battery 1230, the change in thickness of a battery cell, the change in capacity of a battery cell, an operating temperature of the battery 1230, a full charge-discharge pattern of the battery 1230, and the like. The charging circuit 1220 may determine the remaining life or the remaining capacity of the battery 1230 depending on the monitored result.

For example, the charging circuit 1220 may calculate the predicted value of the capacity of the battery 1230 and/or a recommended charging current value according to the number of charge-discharge cycles of the battery 1230. In this regard, the charging circuit 1220 may refer to the battery deterioration information (e.g., the number of charge-discharge cycles) stored in the sub-memory 1223 in advance and the mapped recommended charging current value. According to various embodiments of the present disclosure, whenever a specified time (e.g., 6 months) elapses after the manufacturing date of the battery 1230, the charging circuit 1220 may calculate the predicted value of a battery capacity and/or the recommended charging current value again. For example, the charging circuit 1220 may verify a table recording the predicted value of the capacity of the battery 1230 from the sub-memory 1223 for each hour elapsed after the manufacturing date of the battery 1230, and may obtain at least one of the predicted value of the battery capacity and the recommended charging current value again.

According to various embodiments of the present disclosure, the charging circuit 1220 may measure the internal resistance or impedance of the battery 1230, the thickness of the battery cell, the capacity of the battery cell, or the like periodically (e.g., for each battery charging cycle of a specified frequency) or randomly (e.g., whenever an error of a battery state, temperature abnormality, or the like is sensed). In the case where the internal resistance of the battery exceeds a specific critical value (e.g., 600 ohm), in the case where the change in thickness of the battery cell exceeds a specific critical value (e.g., 10% based on an initial state), and in the case where the change in capacity of at least one battery cell that a capacity change detection circuit mounted in the battery calculates is greater than or equal to a critical value, the charging circuit 1220 may obtain at least one of the predicted value of the battery capacity and the recommended charging current value, based on information about the table recording the predicted value of the capacity of the battery and/or the recommended charging current value for each case.

According to various embodiments of the present disclosure, the charging circuit 1220 may monitor the charge-discharge pattern of a user of the battery 1230. In the case where the frequency of full charge-discharge (e.g., fully charging (e.g., charging over 99%) after the power of the battery 1230 is consumed until a specified ratio (e.g., below 5%)) is greater than or equal to a critical value, or in the case where the frequency of full charge-discharge in a specified interval is greater than or equal to a specified frequency, the charging circuit 1220 may verify the information about the table recording the predicted value of the battery capacity and/or the recommended charging current value according to each case from the sub-memory 1223 for the purpose of obtaining at least one of the predicted value of the battery capacity and the recommended charging current value according to the corresponding situation.

In step 1305, the charging circuit 1220 may change a battery charging current. For example, the charging circuit 1220 may charge the battery 1230 in a static current charging interval based on the obtained predicted value of the battery capacity or the obtained recommended charging current value.

Figure 14:
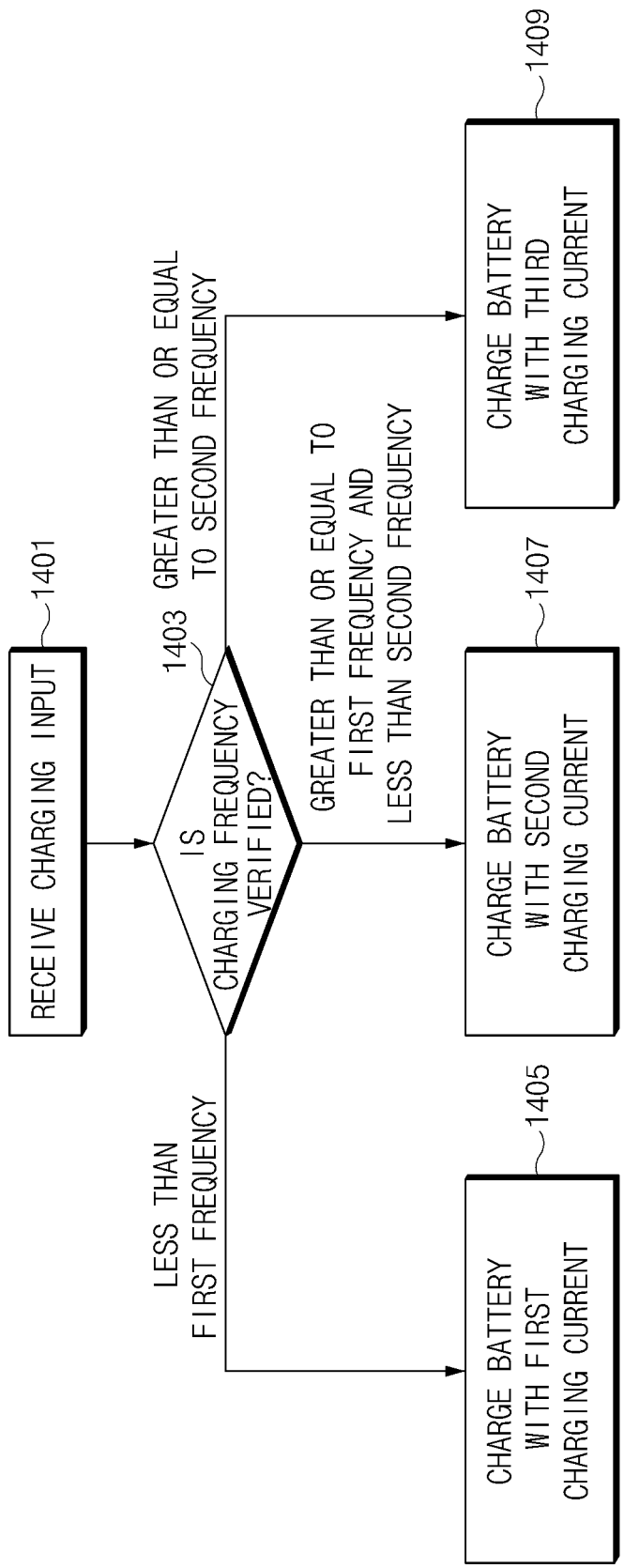
FIG. 14 is a flowchart illustrating a battery charging method associated with a change in a charging current according to a charging frequency according to an embodiment of the present disclosure.

FIG. 14 is a flowchart illustrating a battery charging method associated with a change in a charging current according to a charging frequency according to an embodiment of the present disclosure.

Referring to FIG. 14, with regard to the battery charging method, in step 1401, the charging circuit 1220 may receive a charging input.

In step 1403, the charging circuit 1220 may verify a charging frequency. In this regard, the charging circuit 1220 may include a detector that detects the number of charging cycles of the battery 1230. For example, the charging circuit 1220 may include a coulomb counter 155 and may detect the number of coulombs that is provided to the battery 1230 when the battery 1230 is charged. According to various embodiments of the present disclosure, in the case where the charging circuit 1220 first charges the battery 1230 after the battery 1230 is mounted, or in the case where the charging circuit 1220 charges the battery 1230 after the battery 1230 is fully discharged, the charging circuit 1220 may determine how many coulombs are needed to fully charge the battery 1230 by using the coulomb counter. The charging circuit 1220 may record and manage the number of coulombs, which is used to fully charge the battery 1230, as a real maximum charging capacity of the corresponding battery 1230. Afterwards, the charging circuit 1220 may record and manage the case where the charging and discharging is performed by the number of coulombs corresponding to the maximum charging capacity while performing charge-discharge, as a one-time charging cycle or a one-time charge-discharge cycle.

In the case where the charging frequency of the battery 1230 is less than a first frequency, in step 1405, the charging circuit 1220 may allow the battery 1230 to be charged with a first charging current. For example, in the case where the charging frequency of the battery 1230 is greater than or equal to 200 times, the charging circuit 1220 may allow the battery 1230 to be charged with an initial charging current value (e.g., 3 A).

In the case where the charging frequency of the battery 1230 is greater than or equal to the first frequency and is less than a second frequency, in step 1407, the charging circuit 1220 may allow the battery 1230 to be charged with a second charging current. For example, in the case where the charging frequency of the battery 1230 is greater than or equal to 200 times and is less than 400 times, the charging circuit 1220 may allow the battery 1230 to be charged with a charging current value of 2.7 A.

In the case where the charging frequency of the battery 1230 is greater than or equal to the second frequency, in step 1409, the charging circuit 1220 may allow the battery 1230 to be charged with a third charging current. For example, in the case where the charging frequency of the battery 1230 is greater than or equal to 400 times, the charging circuit 1220 may allow the battery 1230 to be charged with a charging current value of 2.4 A.

In the above-mentioned operation, the charging circuit 1220 may adjust the charging current value depending on the outside or inside temperature of the electronic device 1200, or the outside or inside temperature of the battery 1230. For example, even though the charging frequency is greater than or equal to 200 times and is less than 400 times, the charging circuit 1220 may charge the battery 1230 with 2.9 A greater than 2.7 A, in a static current charging interval. Alternatively, even though the charging frequency is greater than or equal to 400 times, the charging circuit 1220 may charge the battery 1230 with 2.7 A greater than 2.4 A, in a static current charging interval.

Figure 15:
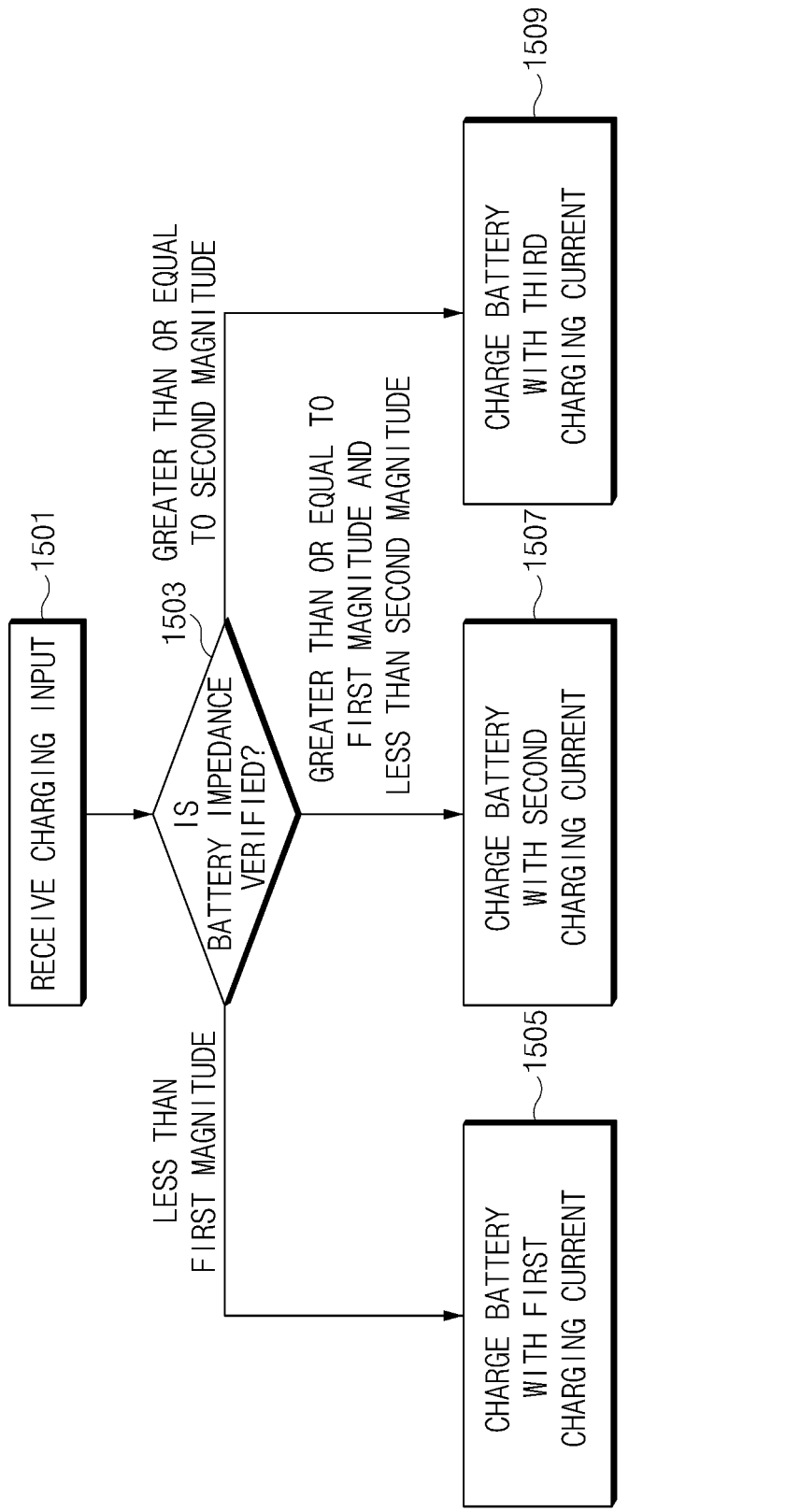
FIG. 15 is a flowchart illustrating a battery charging method associated with a change in a charging current according to battery impedance according to an embodiment of the present disclosure.

FIG. 15 is a flowchart illustrating a battery charging method associated with a change in a charging current according to battery impedance according to an embodiment of the present disclosure.

Referring to FIG. 15, with regard to the battery charging method, in step 1501, the charging circuit 1220 may receive a charging input. In step 1503, the charging circuit 1220 may verify battery impedance. In this regard, the charging circuit 1220 may further include a detection circuit capable of detecting the battery impedance.

In the case where the battery impedance is less than a first magnitude, in step 1505, the charging circuit 1220 may allow the battery 1230 to be charged with a first charging current. For example, in the case where the battery impedance is less than 200 ohm, the charging circuit 1220 may allow the battery 1230 to be charged with an initial charging current value (e.g., 3 A).

In the case where the battery impedance is greater than or equal to the first magnitude and is less than a second magnitude, in step 1507, the charging circuit 1220 may allow the battery 1230 to be charged with a second charging current. For example, in the case where the battery impedance is greater than or equal to 200 ohm and is less than 400 ohm, the charging circuit 1220 may allow the battery 1230 to be charged with a specified charging current value (e.g., 2.7 A).

In the case where the battery impedance is greater than or equal to the second magnitude, in step 1509, the charging circuit 1220 may allow the battery 1230 to be charged with a third charging current. For example, in the case where the battery impedance is greater than or equal to 400 ohm, the charging circuit 1220 may allow the battery 1230 to be charged with a charging current value (e.g., 2.4 A) less than the specified charging current value.

As described above, an electronic device according to an embodiment of the present disclosure may monitor the charging cycles or discharging cycles of a battery. When a specific cycle is reached (e.g., every 50 cycles), the electronic device may change the battery charging current quantity to perform charging with a stable current that does not overload a battery cell, thereby reducing the battery deterioration factor which may increase the life of the battery.

According to various embodiments of the present disclosure, an electronic device according to an embodiment may include a charging interface (e.g., a charging interface to which a charging device is connected) receiving an input associated with battery charging, a memory storing battery deterioration information, and a processor or a charging circuit electrically connected to the charging interface and the memory. The processor may verify the battery deterioration information (e.g., at least one of the charging cycles of the battery and the impedance of the battery) and may allow the charging device to supply a charging current of a specified magnitude during a specified time depending on the battery deterioration information (e.g., at least one of the magnitude of the charging cycles of the battery and the impedance magnitude of the battery). The processor may allow the charging device to supply the specified charging current depending on the battery deterioration information during an interval in which a battery is charged based on the static current.

Figure 16:
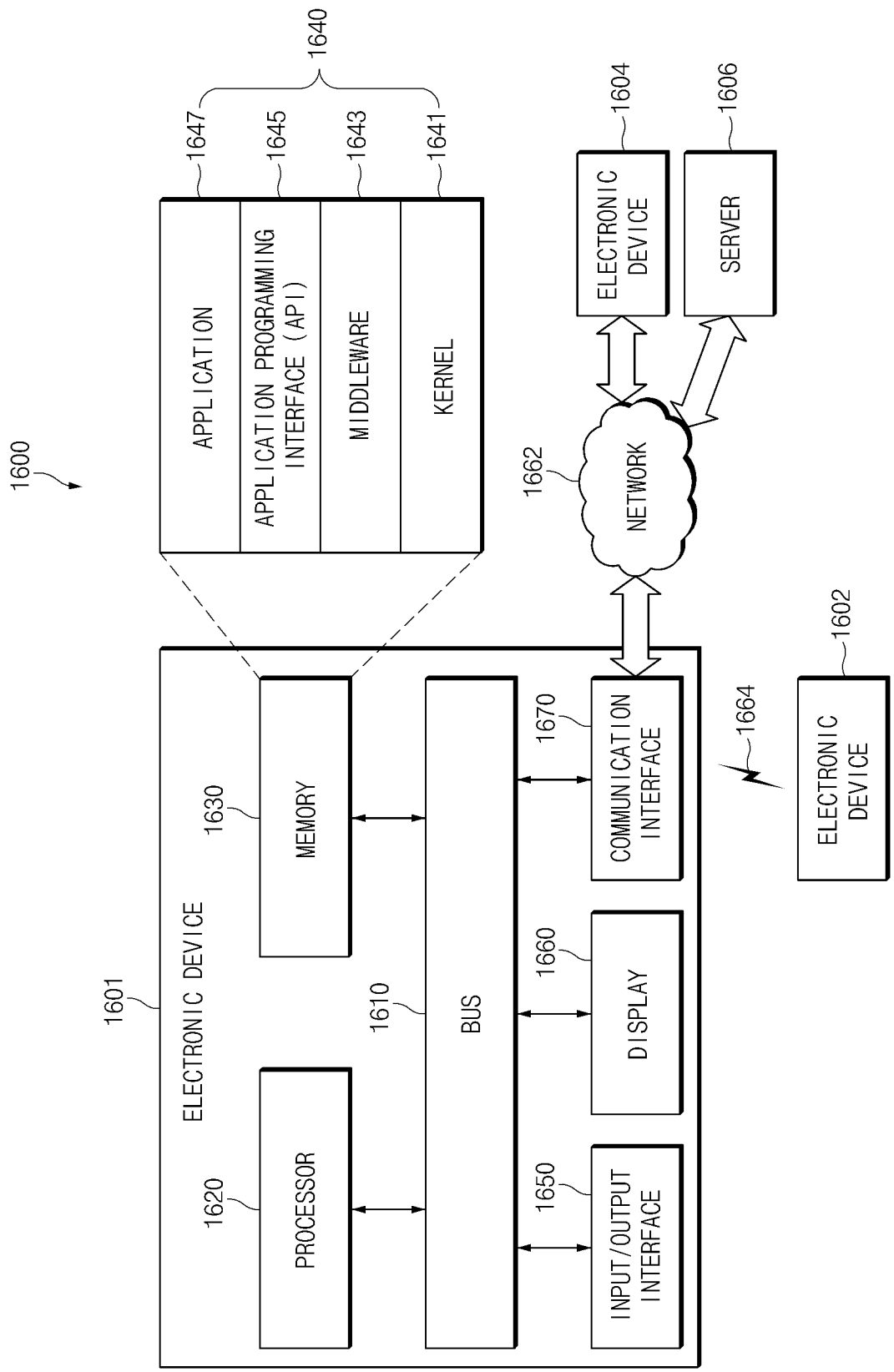
FIG. 16 illustrates an electronic device operating environment according to an embodiment of the present disclosure.

FIG. 16 illustrates an electronic device operating environment according to an embodiment of the present disclosure.

Referring to FIG. 16, there is illustrated an electronic device 1601 in a network environment 1600 according to various embodiments of the present disclosure of the present disclosure. The electronic device 1601 (e.g., the electronic device 100) may include a bus 1610, a processor 1620, a memory 1630, an input/output (I/O) interface 1650, a display 1660, and a communication interface 1670. The electronic device 1601 may omit at least one of the above-described elements or may further include any other element(s).

The bus 1610 may be, for example, a circuit which connects the components 1620 to 1670 with each other and transmits a communication signal (e.g., a control message and/or data) between the components.

The processor 1620 may include one or more of a CPU, an AP, or a CP. For example, the processor 1620 may perform calculation or data processing about control and/or communication of at least another of the components of the electronic device 1601.

In the network environment 1600, the electronic device 1601 may receive information associated with a setting change of a battery charging limit timer from a server or another external electronic device and store the information in a memory. If the electronic device 1601 verifies information about the battery (e.g., information about the setting of charging limit timer) stored in the memory and obtains the setting time of a charging limit timer mapped to information corresponding to a current battery charging environment, the electronic device 1601 may set the time of the charging limit timer. For example, the information about the battery may include the setting time of the charging limit timer for each outside temperature of an electronic device, which is a factor for adjusting a charging limit timer with regard to a battery, the setting time of the charging limit timer for each battery charging cycle frequency, the setting time of the charging limit timer for each amount of charge of a battery, the setting time of the charging limit timer for each magnitude of the charging current or for each charging time of the charging current, the setting time of the charging limit timer according to the number of days elapsed from the manufacturing date of the battery, or the like. Alternatively, the information about the battery may include the setting time of the charging limit timer according to the complex state of the above-described various elements.

The memory 1630 may include a volatile and/or non-volatile memory. The memory 1630 may store, for example, a command or data associated with at least another of the components of the electronic device 1601. According to an embodiment of the present disclosure, the memory 1630 may store software and/or a program 1640. The program 1640 may include, for example, a kernel 1641, a middleware 1643, an application programming interface (API) 1645, and/or at least one application program 1647, and the like. At least part of the kernel 1641, the middleware 1643, or the API 1645 may be referred to as an operating system (OS).

The kernel 1641 may control or manage, for example, system resources (e.g., the bus 1610, the processor 1620, the memory 1630, and the like) used to execute an operation or function implemented in the other programs (e.g., the middleware 1643, the API 1645, or the application program 1647). Also, as the middleware 1643, the API 1645, or the application program 1647 accesses a separate component of the electronic device 1601, the kernel 1641 may provide an interface which may control or manage system resources.

The middleware 1643 may be, for example, a go-between such that the API 1645 or the application program 1647 communicates with the kernel 1641 to communicate data.

Also, the middleware 1643 may process one or more work requests, received from the application program 1647, in order of the assigned priority. For example, the middleware 1643 may assign priority which may use system resources (the bus 1610, the processor 1620, or the memory 1630, and the like) of the electronic device 1601 to at least one of the at least one application program 1647. For example, the middleware 1643 may perform scheduling or load balancing for the one or more work requests by processing the one or more work requests in order of the priority assigned to the at least one of the at least one application program 1647.

The API 1645 may be, for example, an interface in which the application program 1647 controls a function provided from the kernel 1641 or the middleware 1643. For example, the API 1645 may include at least one interface or function (e.g., a command) for file control, window control, image processing, text control, and the like.

The input and output interface 1650 may be, for example, an interface which may transmit a command or data input from a user or another external device to another component or other components of the electronic device 1601. Also, input and output interface 1650 may output an instruction or data received from another component or other components of the electronic device 1601 to the user or the other external device.

The display 1660 may include, for example, a liquid crystal display (LCD), a light emitting diode (LED) display, an organic LED (OLED) display, a microelectromechanical systems (MEMS) display, or an electronic paper display. The display 1660 may display, for example, a variety of content (e.g., text, images, videos, icons, symbols, and the like) to the user. The display 1660 may include a touch screen, and may receive, for example, touch, gesture, proximity, or a hovering input using an electronic pen or part of a body of the user.

The communication interface 1670 may establish communication between, for example, the electronic device 1601 and an external device (e.g., a first external electronic device 1602, a second external electronic device 1604, or a server 1606). For example, the communication interface 1670 may connect to a network 1662 through wireless communication or wired communication, and may communicate with the external device 1604 or the server 1606.

The wireless communication may use, for example, at least one of long term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM), and the like as a cellular communication protocol. Also, the wireless communication may include, for example, local-area communication 1664. The local-area communication 1664 may include, for example, at least one of wireless-fidelity (Wi-Fi) communication, Bluetooth (BT) communication, near field communication (NFC), global navigation satellite system (GNSS) communication, and the like.

A magnetic stripe transmission (MST) module may generate a pulse based on transmission data using an electromagnetic signal and may generate a magnetic field signal based on the pulse. The electronic device 1601 may output the magnetic field signal to a POS system. The POS system may restore the data by detecting the magnetic field signal using an MST reader and converting the detected magnetic field signal into an electric signal.

The GNSS may include, for example, at least one of a GPS, a Glonass, a Beidou navigation satellite system (Beidou), or a Galileo (e.g., the European global satellite-based navigation system) according to an available area or a bandwidth, and the like. Hereinafter, the term "GPS" used herein may be interchangeably with the "GNSS". The wired communication may include at least one of, for example, USB communication, high definition multimedia interface (HDMI) communication, recommended standard 232 (RS-232) communication, plain old telephone service (POTS) communication, and the like. The network 1662 may include a telecommunications network, for example, at least one of a computer network (e.g., a local area network (LAN) or a wide area network (WAN)), the Internet, or a telephone network.

Each of the first and second external electronic devices 1602 and 1604 may be the same as or a different device from the electronic device 1601. According to an embodiment of the present disclosure, the server 1606 may include a group of one or more servers. All or some of operations executed in the electronic device 1601 may be executed in another electronic device or a plurality of electronic devices 1602, 1604, or the server 1606. If the electronic device 1601 should perform any function or service automatically or according to a request, it may request another device to perform at least part of the function or service, rather than executing the function or service for itself or in addition to the function or service. The other electronic device may execute the requested function or the added function and may transmit the executed result to the electronic device 1601. The electronic device 1601 may process the received result without change or additionally and may provide the requested function or service. For this purpose, for example, cloud computing technologies, distributed computing technologies, or client-server computing technologies may be used.

Figure 17:
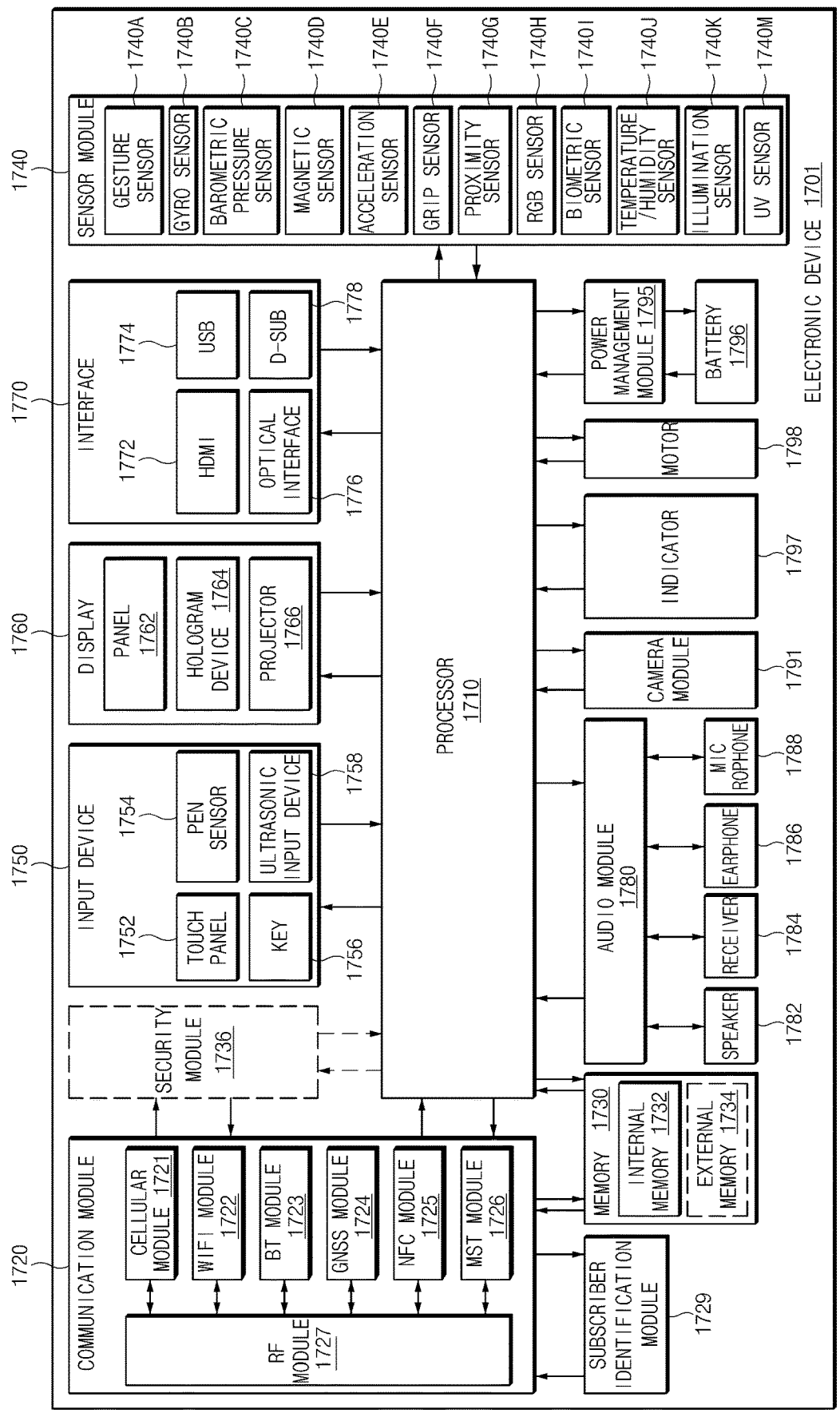
FIG. 17 is a block diagram illustrating a configuration of an electronic device according to various embodiments of the present disclosure.

FIG. 17 is a block diagram illustrating a configuration of an electronic device according to various embodiments of the present disclosure.

Referring to FIG. 17, the electronic device 1701 may include, for example, all or part of an electronic device 1601. The electronic device 1701 may include one or more processors 1710 (e.g., APs), a communication module 1720, a subscriber identification module (SIM) 1729, a memory 1730, a security module 1736, a sensor module 1740, an input device 1750, a display 1760, an interface 1770, an audio module 1780, a camera module 1791, a power management module 1795, a battery 1796, an indicator 1797, and a motor 1798.

The processor 1710 may drive, for example, an OS or an application program to control a plurality of hardware and/or software components connected thereto and may process and compute a variety of data. The processor 1710 may be implemented with, for example, a system on chip (SoC). According to an embodiment of the present disclosure, the processor 1710 may include a graphic processing unit (GPU) and/or an image signal processor (ISP). The processor 1710 may include at least some (e.g., a cellular module 1721) of the components shown in FIG. 17. The processor 1710 may load a command or data received from at least one of other components (e.g., a non-volatile memory) into a volatile memory to process the data and may store various data in a non-volatile memory.

The communication module 1720 may have the same or similar configuration to a communication interface 1670. The communication module 1720 may include, for example, the cellular module 1721, a Wi-Fi module 1722, a BT module 1723, a GNSS module 1724 (e.g., a GPS module, a Glonass module, a Beidou module, or a Galileo module), a NFC module 1725, an MST module 1726, and a radio frequency (RF) module 1727.

The cellular module 1721 may provide, for example, a voice call service, a video call service, a text message service, an Internet service, and the like through a communication network. According to an embodiment of the present disclosure, the cellular module 1721 may identify and authenticate the electronic device 1701 in a communication network using the SIM 1729. The cellular module 1721 may perform at least part of functions which may be provided by the processor 1710. The cellular module 1721 may include a CP.

The Wi-Fi module 1722, the BT module 1723, the GNSS module 1724, the NFC module 1725, or the MST module 1726 may include, for example, a processor for processing data transmitted and received through the corresponding module. According to various embodiments of the present disclosure, at least some (e.g., two or more) of the cellular module 1721, the Wi-Fi module 1722, the BT module 1723, the GNSS module 1724, the NFC module 1725, or the MST module 1726 may be included in one integrated circuit (IC) or one IC package.

The RF module 1727 may transmit and receive, for example, a communication signal (e.g., an RF signal). The RF module 1727 may include, for example, a transceiver, a power amplifier module (PAM), a frequency filter, or a low noise amplifier (LNA), or an antenna, and the like. According to an embodiment of the present disclosure, at least one of the cellular module 1721, the Wi-Fi module 1722, the BT module 1723, the GNSS module 1724, the NFC module 1725, or the MST module 1726 may transmit and receive an RF signal through a separate RF module.

The SIM 1729 may include, for example, a card which includes a SIM and/or an embedded SIM. The SIM 1729 may include unique identification information (e.g., an integrated circuit card identifier (ICCID)) or subscriber information (e.g., an international mobile subscriber identity (IMSI)).

The memory 1730 may include, for example, an embedded memory 1732 or an external memory 1734. The embedded memory 1732 may include at least one of, for example, a volatile memory (e.g., a dynamic random access memory (DRAM), a static RAM (SRAM), a synchronous dynamic RAM (SDRAM), and the like), or a non-volatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory, and the like), a hard drive, or a solid state drive (SSD)).

The external memory 1734 may include a flash drive, for example, a compact flash (CF), a secure digital (SD), a micro-SD, a mini-SD, an extreme digital (xD), a multimedia car (MMC), or a memory stick, and the like. The external memory 1734 may operatively and/or physically connect with the electronic device 1701 through various interfaces.

The security module 1736 may be a module which has a relatively higher security level than the memory 1730 and may be a circuit which stores secure data and guarantees a protected execution environment. The security module 1736 may be implemented with a separate circuit and may include a separate processor. The security module 1736 may include, for example, an embedded secure element (eSE) which is present in a removable smart chip or a removable SD card or is embedded in a fixed chip of the electronic device 1701. Also, the security module 1736 may be driven by an OS different from the OS of the electronic device 1701. For example, the security module 1736 may operate based on a java card open platform (JCOP) OS.

The sensor module 1740 may measure, for example, a physical quantity or may detect an operation state of the electronic device 1701, and may convert the measured or detected information to an electric signal. The sensor module 1740 may include at least one of, for example, a gesture sensor 1740A, a gyro sensor 1740B, a barometer sensor 1740C, a magnetic sensor 1740D, an acceleration sensor 1740E, a grip sensor 1740F, a proximity sensor 1740G, a color sensor 1740H (e.g., red, green, blue (RGB) sensor), a biometric sensor 1740I, a temperature/humidity sensor 1740J, an illumination sensor 1740K, or an ultraviolet (UV) sensor 1740M. Additionally or alternatively, the sensor module 1740 may further include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor, and the like. The sensor module 1740 may further include a control circuit for controlling at least one or more sensors included therein. According to various embodiments of the present disclosure, the electronic device 1701 may further include a processor configured to control the sensor module 1740, as part of the processor 1710 or to be independent of the processor 1710. While the processor 1710 is in a sleep state, the electronic device 1701 may control the sensor module 1740.

The input device 1750 may include, for example, a touch panel 1752, a (digital) pen sensor 1754, a key 1756, or an ultrasonic input device 1758. The touch panel 1752 may use at least one of, for example, a capacitive type, a resistive type, an infrared type, or an ultrasonic type. Also, the touch panel 1752 may further include a control circuit. The touch panel 1752 may further include a tactile layer and may provide a tactile reaction to a user.

The (digital) pen sensor 1754 may be, for example, part of the touch panel 1752 or may include a separate sheet for recognition. The key 1756 may include, for example, a physical button, an optical key, or a keypad. The ultrasonic input device 1758 may allow the electronic device 1701 to detect a sound wave using a microphone 1788 and to verify data through an input tool generating an ultrasonic signal.

The display 1760 may include a panel 1762, a hologram device 1764, or a projector 1766. The panel 1762 may include the same or similar configuration to the display 160 or 1660. The panel 1762 may be implemented to be, for example, flexible, transparent, or wearable. The panel 1762 and the touch panel 1752 may be integrated into one module. The hologram device 1764 may show a stereoscopic image in a space using interference of light. The projector 1766 may project light onto a screen to display an image. The screen may be positioned, for example, inside or outside the electronic device 1701. According to an embodiment of the present disclosure, the display 1760 may further include a control circuit for controlling the panel 1762, the hologram device 1764, or the projector 1766.

The interface 1770 may include, for example, a high-definition multimedia interface (HDMI) 1772, a USB 1774, an optical interface 1776, or a D-subminiature 1778. The interface 1770 may be included in, for example, a communication interface 1670. Additionally or alternatively, the interface 1770 may include, for example, a mobile high definition link (MHL) interface, an SD card/multimedia card (MMC) interface, or an Infrared Data Association (IrDA) standard interface.

The audio module 1780 may convert a sound and an electric signal in dual directions. At least part of components of the audio module 1780 may be included in, for example, an input and output interface 1650 or a user interface. The audio module 1780 may process sound information input or output through, for example, a speaker 1782, a receiver 1784, an earphone 1786, or the microphone 1788, and the like.

The camera module 1791 may be a device which captures a still image and a moving image. According to an embodiment of the present disclosure, the camera module 1791 may include one or more image sensors (e.g., a front sensor or a rear sensor), a lens, an ISP, or a flash (e.g., an LED or a xenon lamp).

The power management module 1795 may manage, for example, power of the electronic device 1701. According to an embodiment of the present disclosure the power management module 1795 may include a PMIC, a charger IC, or a battery gauge. The PMIC may have a wired charging method and/or a wireless charging method. The wireless charging method may include, for example, a magnetic resonance method, a magnetic induction method, or an electromagnetic method, and the like. An additional circuit for wireless charging, for example, a coil loop, a resonance circuit, or a rectifier, and the like may be further provided. The battery gauge may measure, for example, the remaining capacity of the battery 1796 and voltage, current, or temperature thereof while the battery 1796 is charged. The battery 1796 may include, for example, a rechargeable battery or a solar battery.

The indicator 1797 may display a specific state of the electronic device 1701 or part (e.g., the processor 1710) thereof, for example, a booting state, a message state, or a charging state, and the like. The motor 1798 may convert an electric signal into mechanical vibration and may generate vibration or a haptic effect, and the like. The electronic device 1701 may include a processing unit (e.g., a GPU) for supporting a mobile TV. The processing unit for supporting the mobile TV may process media data according to standards, for example, a digital multimedia broadcasting (DMB) standard, a digital video broadcasting (DVB) standard, or a mediaFlo™ standard, and the like.

Each of the above-mentioned elements of the electronic device according to various embodiments of the present disclosure may be configured with one or more components, and names of the corresponding elements may be changed according to the type of the electronic device. The electronic device may include at least one of the above-mentioned elements, some elements may be omitted from the electronic device, or other additional elements may be further included in the electronic device. Also, some of the elements of the electronic device may be combined with each other to form one entity, thereby making it possible to perform the functions of the corresponding elements in the same manner as before the combination.

The term "module" used herein may mean, for example, a unit including one of hardware, software, and firmware or two or more combinations thereof. The term "module" may be interchangeably used with, for example, terms "unit", "logic", "logical block", "component", or "circuit", and the like. The "module" may be a minimum unit of an integrated component or a part thereof. The "module" may be a minimum unit performing one or more functions or a part thereof. The "module" may be mechanically or electronically implemented. For example, the "module" may include at least one of an application specific integrated circuit (ASIC) chip, field programmable gate arrays (FPGAs), or a programmable logic device, which is well known or will be developed in the future, for performing certain operations.

According to various embodiments of the present disclosure, at least part of a device (e.g., modules or the functions) or a method (e.g., operations) may be implemented with, for example, instructions stored in computer-readable storage media which have a program module. When the instructions are executed by a processor, one or more processors may perform functions corresponding to the instructions. The computer-readable storage media may be, for example, a memory.

The computer-readable storage media may include a hard disc, a floppy disk, magnetic media (e.g., a magnetic tape), optical media (e.g., a compact disc read only memory (CD-ROM) and a DVD), magneto-optical media (e.g., a floptical disk), a hardware device (e.g., a ROM, a random access memory (RAM), or a flash memory, and the like), and the like. Also, the program instructions may include not only assembly code compiled by a compiler but also high-level language code which may be executed by a computer using an interpreter and the like. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included. Operations executed by modules, program modules, or other components may be executed by a successive method, a parallel method, a repeated method, or a heuristic method. Also, some operations may be executed in a different order or may be omitted, and other operations may be added.

The control unit may include a microprocessor or any suitable type of processing circuitry, such as one or more general-purpose processors (e.g., ARM-based processors), a digital signal processor (DSP), a programmable logic device (PLD), an ASIC, a FPGA, a GPU, a video card controller, etc. In addition, it would be recognized that when a general purpose computer accesses code for implementing the processing shown herein, the execution of the code transforms the general purpose computer into a special purpose computer for executing the processing shown herein. Any of the functions and steps provided in the drawings may be implemented in hardware, software or a combination of both and may be performed in whole or in part within the programmed instructions of a computer. In addition, a person skilled in the art understands and appreciates that a "processor" or "microprocessor" may be hardware in the present disclosure.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a battery;
    a charging circuit;
    a temperature senor configured to measure an outside temperature; and
    a processor electrically connected to the battery, the charging circuit, and the temperature senor, wherein the processor is configured to:
obtain context information associated with charging of the battery;
if the context information satisfies a first specified condition, set a timer associated with a charging time of the charging circuit to a first time;
if the context information satisfies a second specified condition, set the timer to a second time;
wherein the first specified condition is a condition that a charging device is a first type device,
wherein the second specified condition is a condition that the charging device is a second type device,
wherein the first type device supplies low charging power than the second type device,
wherein the first time is longer than the second time,
if the context information satisfies a third specified condition, set the time to a third time;
if the context information satisfies a fourth specified condition, set the timer to a fourth time,
wherein the third specified condition is a condition that the outside temperature is less than a first temperature,
wherein the fourth specified condition is a condition that the outside temperature is greater than or equal to the first temperature,
wherein the fourth time is longer than the third time,
charge the battery by using the charging circuit during the first time when the first specified condition is satisfied, during the second time when the second specified condition is satisfied, during the third time when the third specified condition is satisfied, or during the fourth time when the fourth specified condition is satisfied, and
obtain information of at least one of a charging frequency of the battery, a charging speed of the battery, or a state of charge of the battery, as at least partial information of the context information.

2. The electronic device of claim 1, wherein the processor is further configured to obtain the context information in response to occurrence of a specified event.

3. The electronic device of claim 2, wherein the processor is further configured to sense connection between the electronic device and an external power device as at least part of the specified event.

4. The electronic device of claim 2, wherein the processor is further configured to sense a user input to the electronic device as at least part of the specified event.

5. The electronic device of claim 2, wherein the processor is further configured to provide notification information corresponding to an operation of limiting the charging of the electronic device.

6. The electronic device of claim 1, wherein the processor is further configured to obtain information of a type of an external power device connected to the electronic device as at least partial information of the context information.

7. The electronic device of claim 1, wherein the processor is further configured to obtain information of a power capacity capable of being supplied through an external power device connected to the electronic device as at least partial information of the context information.

8. The electronic device of claim 1, wherein the processor is further configured to obtain information of an inside temperature or an outside temperature of the electronic device as at least partial information of the context information.

9. A battery charging control method of an electronic device that includes a battery supplying power, a charging circuit charging the battery, a temperature sensor measuring an outside temperature, and a processor, the method comprising:
obtaining context information associated with charging of the battery by using the processor;
if the context information satisfies a first specified condition, setting a tinier associated with a charging time of the charging circuit to a first time;
if the context information satisfies a second specified condition, setting the timer to a second time;
wherein the first specified condition is a condition that a charging device is a first type device,
wherein the second specified condition is a condition that the charging device is a second type device,
wherein the first type device supplies low charging power than the second type device,
wherein the first time is longer than the second time,
if the context information satisfies a third specified condition, set the time to a third time;
if the context information satisfies a fourth specified condition, set the timer to a fourth time,
wherein the third specified condition is a condition that the outside temperature is less than a first temperature,
wherein the fourth specified condition is a condition that the outside temperature is greater than or equal to the first temperature,
wherein the fourth time is longer than the third time, and
charging the battery by using the charging circuit during the first time when the first specified condition is satisfied, during the second time when the second specified condition is satisfied, during the third time when the third specified condition is satisfied, or during the fourth time when the fourth specified condition is satisfied,
wherein obtaining context information includes obtaining information of at least one a charging frequency of the battery, a charging speed of the battery, or a state of charge of the battery, as at least partial information of the context information.

10. The method of claim 9, wherein obtaining context information includes obtaining the context information in response to occurrence of a specified event.

11. The method of claim 9, wherein obtaining context information includes sensing connection between the electronic device and an external power device as at least part of the specified event.

12. The method of claim 9, wherein obtaining context information includes sensing a user input to the electronic device as at least part of the specified event.

13. The method of claim 9, wherein obtaining context information includes obtaining information of a type of an external power device connected to the electronic device as at least partial information of the context information.

14. The method of claim 9, wherein obtaining context information includes obtaining information of a power capacity capable of being supplied through an external power device connected to the electronic device as at least partial information of the context information.

15. The method of claim 9, wherein Obtaining context information includes obtaining information of an inside temperature or an outside temperature of the electronic device as at least partial information of the context information.

16. The method of claim 9, further comprising:
providing notification information corresponding to an operation of limiting the charging of the electronic device.

17. An electronic device comprising:
a housing;
a battery disposed inside the housing;
a charging interface disposed on the housing
a sensor disposed in the housing and configured to measure an outside temperature; and
a charging circuit electrically connected to the battery, the charging interface, and the sensor, and configured to control charging of the battery through the charging interface,
wherein the charging circuit is configured to:
if a charging device is connected to the charging interface, collect at least one factor associated with a charging environment of the battery and determine a change of a setting time of a charging limit timer limiting the charging of the battery, depending on the at least one factor,
control the setting time of the charging limit timer depending on at least one of an amount of charge of the battery at a start of charging, a magnitude of a charging current that the charging device supplies, a charging speed of the charging device, an outside temperature of the electronic device, or the number of days elapsed from a manufacturing date of the battery,
in the case where the charging device is a first type device, set the setting time of the charging limit timer to a first time,
in the case where the charging device is a second type device, set the setting time of the charging limit timer to a second time,
wherein the first type device supplies low charging power than the second type device,
wherein the first time is longer than the second time,
in the case where the outside temperature is less than a first temperature, set the setting time of the charging limit timer to a third time, and
in the case where the outside temperature is greater than or equal to the first temperature, set the setting time of the charging limit timer to a fourth time,
wherein the fourth time is longer than the third time.

18. The electronic device of claim 17, wherein the charging circuit is further configured to:
calculate and store a charging cycle of the battery whenever the battery is charged; and
as the number of charging cycles of the battery increases, set the setting time of the charging limit timer to be longer, or as an outside temperature of the electronic device increases, set the setting time of the charging limit timer to be longer.

19. The electronic device of claim 17, wherein the charging circuit is further configured to:
as a magnitude of a charging current increases, set the setting time of the charging limit timer to be longer; or
as a ratio of an amount of charge increases, set the setting time of the charging limit timer to be shorter.

* * * * *